United States Patent
Kim et al.

(10) Patent No.: US 9,778,796 B2
(45) Date of Patent: Oct. 3, 2017

(54) APPARATUS AND METHOD FOR SENSING OBJECT, AND METHOD OF IDENTIFYING CALIBRATION PATTERN IN OBJECT SENSING APPARATUS

(71) Applicant: Samsung Electronics Co., Ltd., Suwon-Si, Gyeonggi-Do (KR)

(72) Inventors: Nam Joon Kim, Anyang-si (KR); Sung Joo Suh, Seoul (KR); Chang Kyu Choi, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 218 days.

(21) Appl. No.: 14/328,258

(22) Filed: Jul. 10, 2014

(65) Prior Publication Data

US 2015/0015544 A1    Jan. 15, 2015

(30) Foreign Application Priority Data

Jul. 15, 2013  (KR) .......... 10-2013-0083006
May 16, 2014  (KR) .......... 10-2014-0059071

(51) Int. Cl.
*G06F 3/042*  (2006.01)
*G06F 3/041*  (2006.01)

(52) U.S. Cl.
CPC .......... *G06F 3/0425* (2013.01); *G06F 3/0418* (2013.01); *G06F 2203/04104* (2013.01)

(58) Field of Classification Search
USPC ....................................................... 345/175
See application file for complete search history.

(56) References Cited

U.S. PATENT DOCUMENTS

| | | | |
|---|---|---|---|
| 7,432,917 B2 | 10/2008 | Wilson et al. | |
| 7,519,223 B2 | 4/2009 | Dehlin et al. | |
| 7,626,578 B2 | 12/2009 | Wilson et al. | |
| 2005/0260986 A1* | 11/2005 | Sun ...................... | H04N 9/3179 455/433 |
| 2006/0010400 A1* | 1/2006 | Dehlin .................. | G06F 3/0354 715/856 |
| 2010/0060611 A1 | 3/2010 | Nie | |
| 2012/0001861 A1 | 1/2012 | Townsend et al. | |
| 2012/0060127 A1 | 3/2012 | Ilmonen | |
| 2012/0206416 A1 | 8/2012 | Ilmonen | |

FOREIGN PATENT DOCUMENTS

| | | |
|---|---|---|
| JP | 2006039686 A | 2/2006 |
| KR | 20040042147 A | 5/2004 |
| KR | 20080092841 A | 10/2008 |
| KR | 20110056167 A | 5/2011 |
| KR | 20110056892 A | 5/2011 |

* cited by examiner

*Primary Examiner* — Gustavo Polo
(74) *Attorney, Agent, or Firm* — Harness, Dickey & Pierce, P.L.C.

(57) ABSTRACT

At least one example embodiment discloses an apparatus for sensing an object, the apparatus including a display, a light source configured to emit light toward the display, a pattern layer on the display, the pattern layer including a first pattern for identifying a position on the display, a camera configured to generate a pattern image based on light reflected off of the pattern layer, and a controller configured to adjust an operation of at least one of the light source and the camera based on a second pattern displayed in the pattern image.

33 Claims, 25 Drawing Sheets

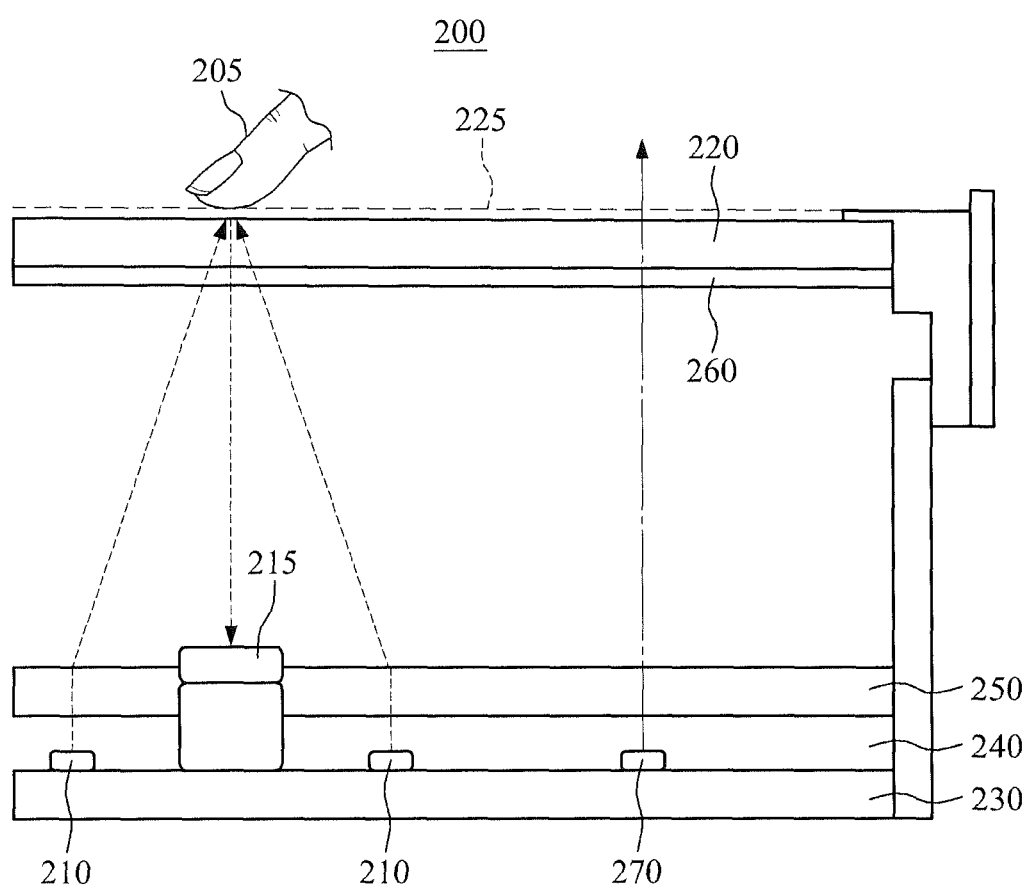

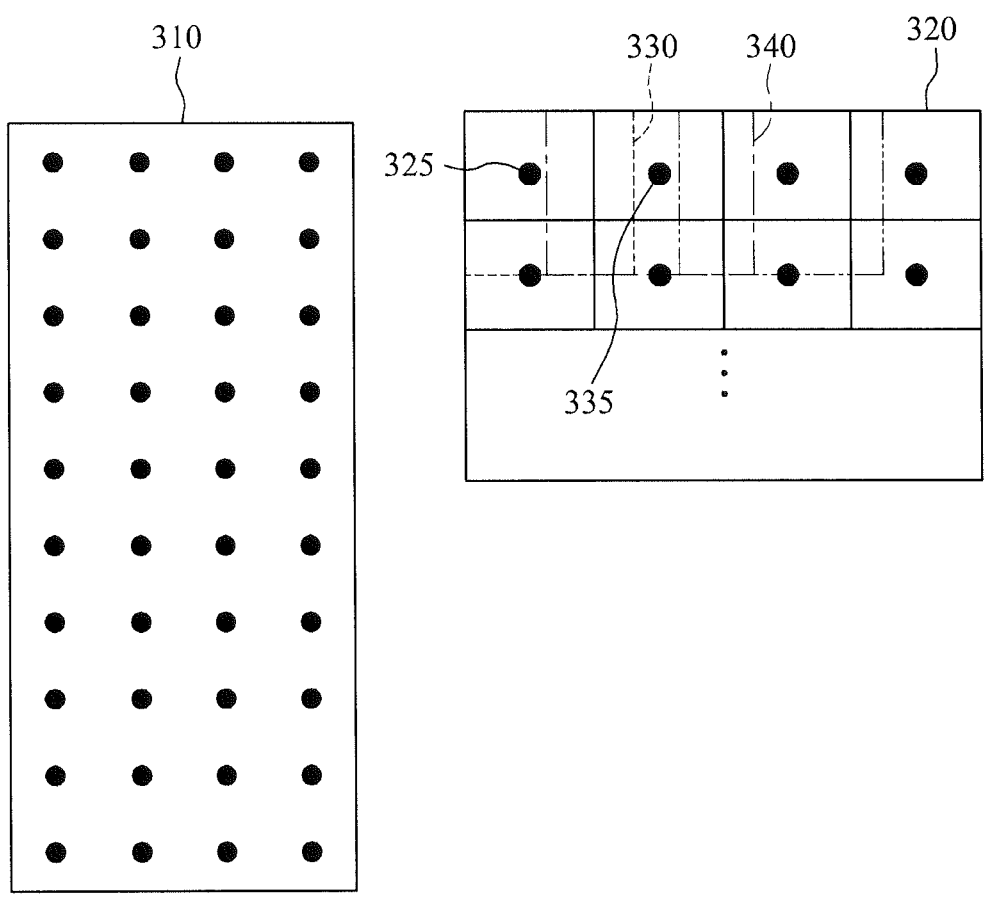

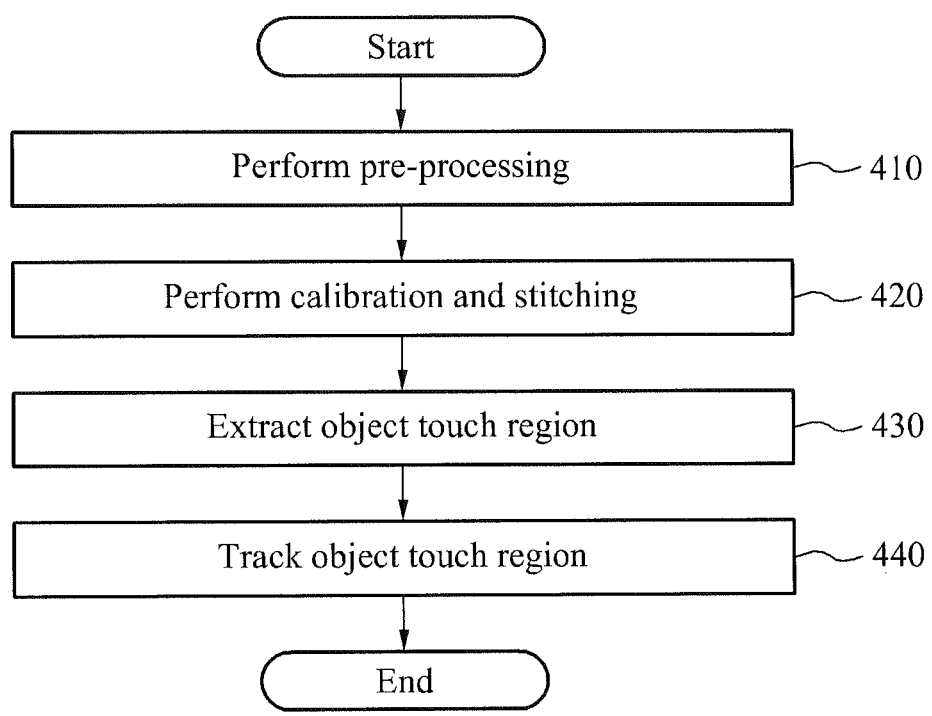

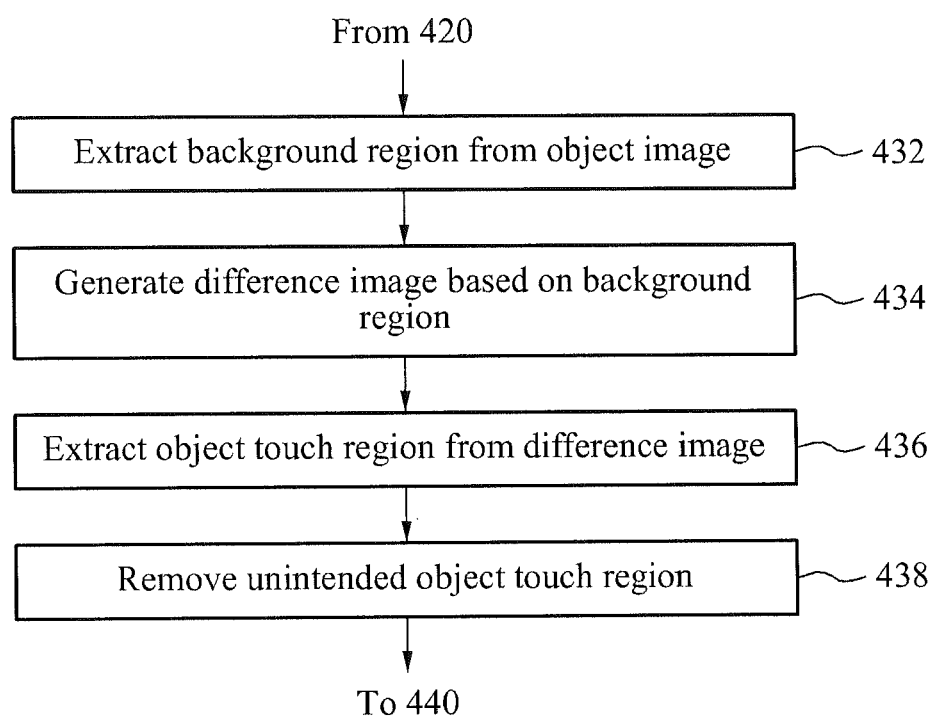

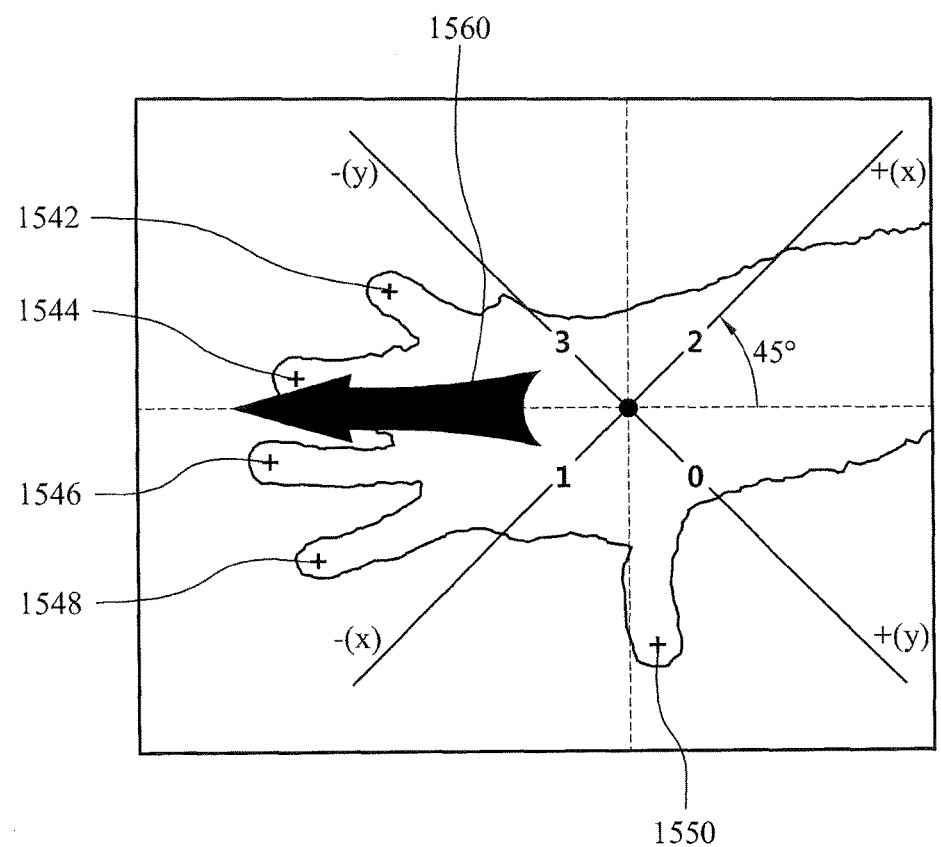

APPARATUS AND METHOD FOR SENSING OBJECT, AND METHOD OF IDENTIFYING CALIBRATION PATTERN IN OBJECT SENSING APPARATUS

CROSS-REFERENCE TO RELATED APPLICATION

This application claims the priority benefit of Korean Patent Application No. 10-2013-0083006, filed on Jul. 15, 2013 and Korean Patent Application No. 10-2014-0059071, filed on May 16, 2014 in the Korean Intellectual Property Office, the disclosure of each of which is incorporated herein by reference in its entirety.

BACKGROUND

1. Field

Example embodiments of the following description relate to an apparatus for sensing an object touched on a display.

2. Description of the Related Art

A technology for multi-touch interaction that enables a user to input information directly on a screen through use of a finger or a pen in lieu of an input device, such as a conventional mouse, or a keyboard is garnering attention. Such touch interaction technology via a screen utilizes a camera, a resistive overlay touch screen, a capacitive overlay touch screen, and/or a digital pen recognizing a touch point by capturing a pattern of a touch screen.

In a touch input method using a digital pen, a light source that emits infrared rays (IR) and an IR camera are used. More particularly, the digital pen emits IRs to recognize a pattern of a display, a camera captures an IR internally reflected by an IR emitter disposed beneath a display screen, and thereby a position of a touch object or a hover object is recognized on a surface display based on a computer vision method.

SUMMARY

At least one example embodiment discloses an apparatus for sensing an object, the apparatus including a display, a light source configured to emit light toward the display, a pattern layer on the display, the pattern layer including a first pattern for identifying a position on the display, a camera configured to generate a pattern image based on light reflected off of the pattern layer, and a controller configured to adjust an operation of at least one of the light source and the camera based on a second pattern displayed in the pattern image.

At least one example embodiment discloses an apparatus for sensing an object, the apparatus including an object touch region extractor configured to extract a first object touch region from an object image, a criterion sub-region determiner configured to divide the object image into a plurality of sub-regions, and determine a criterion sub-region from among the plurality of sub-regions, and an object touch region determiner configured to determine whether to remove the first object touch region based on a second object touch region in the criterion sub-region.

At least one example embodiment discloses a method of identifying a calibration pattern of an apparatus for sensing an object, the method including capturing a pattern image on a display, and adjusting at least one of a brightness of a light source emitting light and an exposure time of a camera based on patterns in the pattern image.

At least one example embodiment discloses a method of sensing an object, the method including extracting an first object touch region from an object image, dividing the object image into a plurality of sub-regions, first determining a criterion sub-region from among the plurality of sub-regions, second determining whether to remove the first object touch region displayed in the object image based on a second object touch region in the criterion sub-region, and removing, from the object image, the first object touch region based on the second determining.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 2 illustrates an internal structure of an apparatus for sensing an object according to an example embodiment;

FIG. 3 illustrates an example of a camera array provided within an apparatus for sensing an object according to an example embodiment;

FIGS. 4A through 4D illustrate an overall operation of an apparatus for sensing an object according to an example embodiment;

FIGS. 15A and 15B illustrate a process of determining a directivity of an object touch region according to another example embodiment;

DETAILED DESCRIPTION

Figure 1:
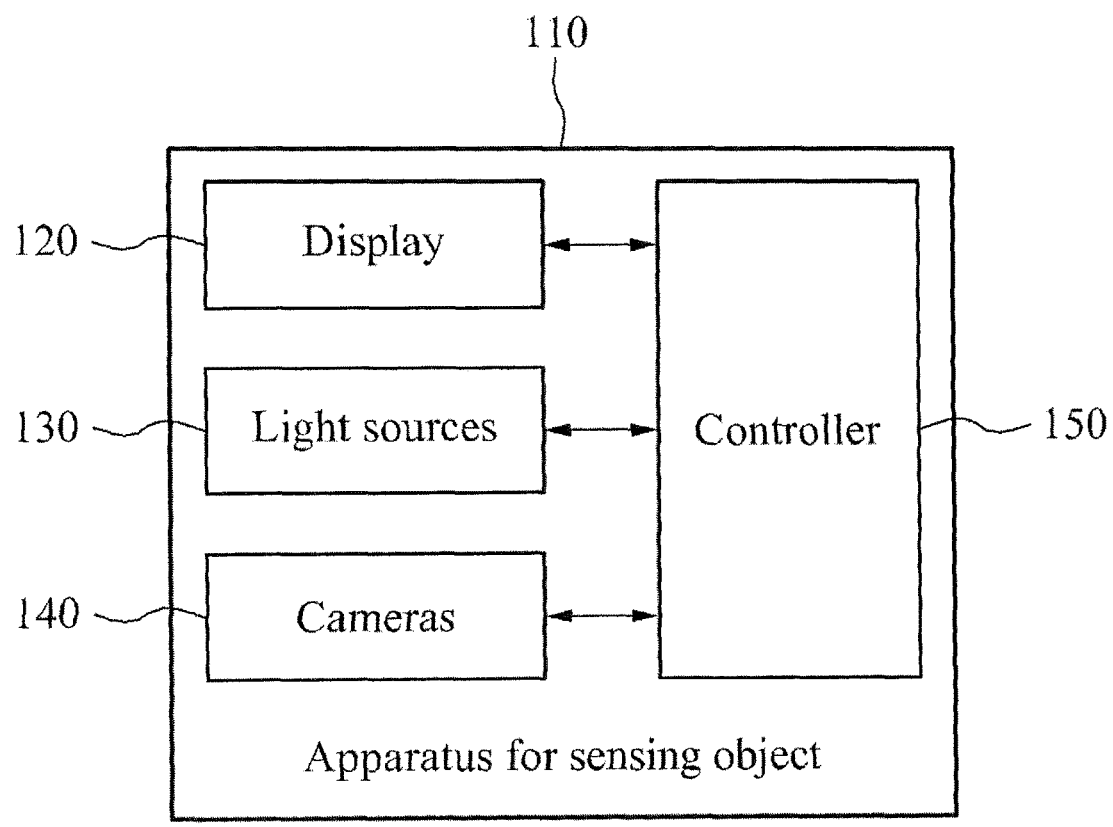
FIG. 1 illustrates a configuration of an apparatus for sensing an object according to an example embodiment.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., digital single lens reflex (DSLR) cameras, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

FIG. 1 illustrates a configuration of an apparatus 110 for sensing an object according to example embodiments.

Referring to FIG. 1, the apparatus 110 for sensing the object may sense an object touch region representing a region in which an object is touched on a display 120, and an object adjacent region, for example, a hover region, representing an adjacent object region on the display 120. The apparatus 110 for sensing the object includes a plurality of light sources 130 and a plurality of cameras 140 to sense the object touch region or the object adjacent region. The apparatus 110 for sensing the object may determine a position at which an object is touched on the display 120 based on a computer vision method by analyzing an object image captured by the plurality of cameras 140. The object image represents an image generated through the plurality of cameras 140 capturing a light reflected off of the object from light emitted by the light source 130.

An object image having differing properties based on a disposition of the plurality of light sources 130 within the apparatus 110 for sensing the object and a property of the plurality of cameras 140, or a position and a distribution relationship of the plurality of light sources 130 in the apparatus 110 for sensing the object and the plurality of cameras 140 may be captured. The object image may be distorted based on the conditions of the plurality of light sources 130 and the plurality of cameras 140. As an example, the captured object image may appear dark or have a low resolution based on the conditions of the plurality of light sources 130 and the plurality of cameras 140. When the object image appears dark or has the low resolution, identifying a position at which the object is touched on the display 120 from the object image may be difficult.

The apparatus 110 for sensing the object may calibrate a distortion of object images output by the plurality of cameras 140, and generate a single object image by combining the calibrated object images. The combining may be stitching, for example, the apparatus 110 for sensing the object may identify the object touch region and the object adjacent region from the generated single object image. A process of mapping a position in the object image to a position on the display 120 may be performed to stitch the object images.

The apparatus 110 for sensing the object may determine optimum and/or desired calibration conditions by controlling the plurality of light sources 130 or adjusting an exposure time of the plurality of cameras 140 to map a position of the object to the position on the display 120. As an example, the apparatus 110 for sensing the object may control a brightness of the plurality of light sources 130, or adjust the exposure time or a shutter speed of the plurality of cameras 140 to capture an object image having a high resolution and an appropriate brightness. The apparatus 110 for sensing the object may use a pattern image obtained by capturing a pattern for identifying the position on the display 120 to determine the optimum and/or desired calibration conditions.

Referring to FIG. 1, the apparatus 110 for sensing the object includes the display 120, the plurality of light sources 130, the plurality of cameras 140, and a controller 150. Also, the apparatus 110 for sensing the object includes a pattern layer (not shown) including the pattern for identifying the position on the display 120. As an example, the pattern layer is a pattern sheet disposed on the display 120, and includes a plurality of calibration points. The pattern of the pattern layer is provided in a form of an array of a block or blob pattern. The pattern of the pattern layer includes a criterion pattern having greater a size than neighboring patterns.

The plurality of light sources 130 may emit a light toward the display 120. The camera 140 may generate a pattern image based on a reflected light returning subsequent to being reflected off of a pattern. As an example, the plurality of light sources 130 may emit an infrared ray (IR) toward the display 120, and the plurality of cameras 140 may generate the pattern image in response to an IR reflected off of the pattern of the pattern layer and incident to the plurality of cameras 140. The light emitted by the plurality of light sources 130 may arrive at the display 120 passing through a diffuser sheet (now shown) provided within the apparatus 110 for sensing the object. The plurality of cameras 140 may generate the object image based on the reflected light reflected off of an object touched on the display 120 or an adjacent object on the display 120. The apparatus 110 for sensing the object may have a structure of an array of the plurality of cameras 140.

The controller 150 may be hardware, firmware, hardware executing software or any combination thereof. When the controller 150 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the controller 150. CPUs, DSPs, ASICs and FPGAs may generally be referred to as processors and/or microprocessors.

In the event where the controller 150 is a processor executing software, the processor is configured as a special purpose machine to execute the software to perform the functions of the controller 150. In such an embodiment, the processor may include one or more Central Processing Units (CPUs), digital signal processors (DSPs), application-specific-integrated-circuits (ASICs), field programmable gate arrays (FPGAs) computers.

The controller 150 may perform a camera calibration process based on a pattern image to obtain camera calibration coordinates of the plurality of cameras 140, corresponding to the position on the display 120. The camera calibration coordinates of the plurality of cameras 140 indicate coordinates corresponding to an actual position on the display 120 in an image generated by the plurality of cameras 140. The controller 150 may adjust an operation of at least one of the plurality of light sources 130 and the plurality of cameras 140 based on a pattern displayed on the pattern image. The controller 150 may adjust the brightness of the plurality of lights 130 for the plurality of cameras 140 or adjust the operation of the plurality of cameras 140 to compensate for differing properties of the plurality of cameras 140 included in the apparatus 110 for sensing the object.

The controller 150 may use a distance from the plurality of cameras 140 to the pattern layer, for example, the distance from the plurality of cameras 140 to the display 120, symmetry amongst the patterns included in the pattern layer, and a distortion model of a camera lens to analyze the pattern displayed on the pattern image. The distortion model of the camera lens represents a distortion map of the camera lens based on a barrel distortion in which an image captured by the plurality of cameras 140 is output having an overall convex curve and a trapezoidal distortion in which an image captured by the plurality of cameras 140 is output in a form of a trapezoid. The distortion model of the camera lens may be provided from a camera lens manufacturer. The controller 150 may evaluate the distortion model of the camera lens during the process of searching for the pattern in the pattern image.

The controller 150 may adjust at least one of the brightness of the plurality of lights 130 and the exposure time, for example, the shutter speed, of the plurality of cameras 140 based on the pattern displayed on the pattern image. The controller 150 may analyze the captured pattern image based on the adjusted brightness of the plurality of lights 130 and the adjusted exposure time of the plurality of cameras 140, and determine whether settings of the plurality of cameras 140 satisfy predetermined and/or desired conditions. The controller 150 may adjust the brightness of the plurality of light sources 130 or the exposure time of the plurality of cameras 140 until the brightness of the plurality of light sources 130 or the exposure time of the plurality of cameras 140 satisfies the predetermined and/or desired conditions. When the brightness of the plurality of light sources 130 or the exposure time of the plurality of cameras 140 satisfying the predetermined and/or desired conditions is determined, the controller 150 may store the determined brightness of the plurality of light sources 130 or the exposure time of the plurality of cameras 140. The apparatus 110 for sensing the object may generate the object touch image based on the brightness of the plurality of light sources 130 or the exposure time of the plurality of cameras 140 determined to obtain optimum and/or desired camera calibration points through use of a calibration pattern, and extract an object touch region from the generated object touch image.

The controller 150 may adjust the operation of the plurality of light sources 130 and the plurality of cameras 140 based on at least one of a distribution of patterns displayed in the pattern image, a number of the patterns, a brightness of the patterns, a resolution of the patterns, and a shape of the patterns. As an example, the controller 150 may determine whether the distribution of the patterns displayed in the pattern image, the number of the patterns, and the brightness of the patterns satisfy predetermined and/or desired conditions. When the patterns of the pattern image do not satisfy the predetermined and/or desired conditions, the controller 150 may adjust the brightness of the plurality of lights 130 or the exposure time of the plurality of cameras 140, and re-determine whether the patterns of the re-captured pattern image satisfy the predetermined and/or desired conditions.

The controller 150 may binarize a pattern image, and generate a binarized pattern image, prior to analyzing the patterns displayed in the pattern image. The controller 150 may extract a center point for a plurality of pattern regions based on the binarized pattern image. The controller 150 may determine whether a number of center points extracted from the binarized pattern image, a position, and a position relationship amongst the center points satisfy predetermined and/or desired conditions, and based on a result of the determination, adjust the operations of the plurality of light sources 130 and the plurality of cameras 140. The controller 150 may determine coordinates on the plurality of cameras 140 corresponding to an initial position being a criterion on a surface, for example, a screen, of the display 120 from the binarized pattern image.

The controller 150 may determine whether a criterion pattern is identifiable from the pattern image, and determine whether the brightness of the plurality of lights 130 or the exposure time of the plurality of cameras 140 is currently appropriate. As an example, the controller 150 may search for a pattern having a greatest size from among patterns displayed in the pattern image, and based on whether a size of the pattern having the greatest size satisfies predetermined and/or desired conditions, determine whether the criterion pattern is identifiable. The controller 150 may increase the brightness of the plurality of light sources 130 or the exposure time of the plurality of cameras 140 when the criterion pattern is unidentified from the pattern image.

When the brightness of the plurality of light sources 130 or the exposure time of the plurality of cameras 140 is low, the pattern image captured by the plurality of cameras 140 may appear dark, or the pattern of the pattern image may not be output appropriately. The controller 150 may adjust the operation of at least one of the plurality of light sources 130 and the plurality of cameras 140 based on whether the number of patterns displayed in the pattern image satisfies the predetermined and/or desired conditions. When the number of patterns displayed in the pattern image is less than a predetermined and/or desired number, the controller 150 may increase the brightness of the plurality of light sources 130 or the exposure time of the plurality of cameras 140. The controller 150 may determine whether the brightness of the plurality of light sources 130 or the exposure time of the plurality of cameras 140 is currently appropriate by comparing a predetermined and/or desired number of patterns with respect to a view region of the plurality of cameras 140 to the number of patterns displayed in the pattern image captured by the plurality of actual cameras 140.

As an example, the controller 150 may determine whether patterns disposed in a vertical direction, for example, vertical criterion patterns, and patterns disposed in a horizontal direction, for example, horizontal criterion patterns are identifiable based on the criterion pattern when the criterion pattern is identified. The controller 150 may determine whether the numbers of the vertical criterion patterns and the horizontal criterion patterns satisfy the predetermined and/or desired conditions, and determine whether the brightness of the plurality of light sources 130 or the exposure time of the plurality of cameras 140 is currently appropriate. Position coordinates of the patterns of the pattern layer to be used for identifying the position on the display 120 may be provided, in advance, to the apparatus 110 for sensing the object. As an example, the apparatus 110 for sensing the object may be provided, in advance, with information about a distribution and a position of the patterns of the pattern layer. The controller 150 may use information about the plurality of cameras 140 and information about a distance from the plurality of cameras 140 to the display 120 to verify position coordinates of the patterns of the pattern layer appropriately match camera image coordinates. As an example, the controller 150 may estimate a distance between pattern blobs within a camera image corresponding to a distance between the patterns on the surface of the displays 120 recognized in advance based on view angle information of the plurality of cameras 140 and the information about the distance from the plurality of cameras 140 to the display 120. The controller 150 may compare the estimated distance between the pattern blobs within the camera image to the distance between the pattern blobs obtained from an actual camera, and when a resulting difference of the comparison is great, determine that a pattern blob on the surface of the display 120 is erroneously identified.

The controller 150 may determine the position within the pattern image of patterns remaining subsequent to excluding the criterion pattern, the vertical criterion patterns, and the horizontal criterion patterns based on a distance ratio between the patterns included in the pattern layer on the surface of the display 120. The distance ratio between the patterns included in the pattern layer on the surface of the display 120 may be information obtainable in advance. The controller 150 may determine a position within the pattern image of the remaining patterns, through use of the distance ratio between the patterns included in the pattern layer, the positions of the criterion pattern, the vertical criterion patterns, and the horizontal criterion patterns. As an example, the controller 150 may determine the position within the pattern image of the remaining patterns through an interpolation method based on a barycentric coordinate algorithm. The controller 150 may determine whether identifying the remaining patterns is possible at a predicted position in the pattern image, and determine whether the position and a number of the identified remaining patterns satisfy predetermined and/or desired conditions. When the position and the number of the remaining patterns do not satisfy the predetermined and/or desired conditions, the controller 150 may adjust the brightness of the plurality of light sources 130 or the exposure time of the plurality of cameras 140 until the remaining patterns are appropriately identified.

The controller 150 may determine the brightness of the plurality of light sources 130 corresponding to the plurality of cameras 140 or the exposure time of the plurality of cameras 140, and initialize the apparatus 110 for sensing the object based on the determined brightness of the plurality of light sources 130 or the exposure time of the plurality of cameras 140. The apparatus 110 for sensing the object may extract the object touch region by analyzing the object image output under conditions in which the plurality of light sources 130 and the plurality of cameras 140 are adjusted.

FIG. 2 illustrates an internal structure of an apparatus for sensing an object according to an example embodiment.

Referring to FIG. 2, the apparatus 200 for sensing the object may be a multi-touch interactive display device based on a diffused illumination (DI) method using a plurality of IR video cameras. The apparatus 200 for sensing the object includes a camera 215 disposed on a substrate 230, for example, a printed circuit board (PCB), and a light source 210 disposed around the camera 215. An air gap 240 and a first diffusion sheet 250 on which light emitted from the light source 210 is uniformly dispersed may be disposed on the substrate 230.

The light emitted from the light source 210 may pass through a second diffusion sheet 260, pass through a display 220, for example, a liquid crystal display (LCD) layer, and a pattern layer 225 disposed on the display 220, and be reflected off of an object 205, such as a hand of a user. A reflected light generated through being reflected off of the object 205 may be input to the camera 215 of the apparatus 220 for sensing the object, and an object image may be generated. The generated object image includes a pattern image obtained by capturing a pattern of the pattern layer 225. As an example, the light source 210 may emit the IR, and the camera 215 may generate the object image in response to the IR reflected off of the object 205.

The apparatus 200 for sensing the object may determine whether the object 205 on the display 200 is touched or adjacent based on a computer vision method with respect to the object image captured by the camera 215. The apparatus 200 for sensing the object may recognize the object touch region, as being durable against an external light, without being restricted by a number of touches on the object 205 based on the computer vision method. The apparatus 200 for sensing the object further includes a protection glass (not shown) for protecting the display 220 on the display 220.

As an example, the display 220 may include an LCD or a light emitting diode (LED), and output an image. The apparatus 200 for sensing the object includes a white light source 270 to display an image on an LCD or LED screen. As another example, the white light source 270 may include a white LED emitter, and be provided on the substrate 230 of the apparatus 200 for sensing the object.

FIG. 3 illustrates an example of an array of cameras provided within an apparatus for sensing an object according to an example embodiment.

Referring FIG. 3, an array 310 of 40 cameras is provided on a bottom substrate of the apparatus for sensing the object. Four cameras are disposed in parallel, and ten cameras are disposed vertically in the apparatus for sensing the object.

An image 320 represents a region belonging to a plurality of cameras of the camera array 310. As an example, a first region 330 of a first camera 325 and a second region 340 of a second camera 335 may exist, and a predetermined and/or desired region may overlap between the first region 330 and the second region 340. The plurality of cameras included in the camera array 310 may capture a display region belonging to each of the plurality of cameras. The apparatus for sensing the object may stitch or splice an image generated by the plurality of cameras, and generate a single image.

FIGS. 4A through 4D illustrate an overall operation of an apparatus for sensing an object according to an example embodiment.

FIG. 4A illustrates an overall operation of the apparatus for sensing the object. In operation 410, the apparatus for sensing the object may perform pre-processing through use of a pattern image to obtain camera coordinates corresponding to a criterion position on a surface of a display.

In operation 420, the apparatus for sensing the object may calibrate a distortion of a camera, and stitch an image output by the plurality of cameras, and generate a single image. The apparatus for sensing the object may calibrate a barrel distortion and a trapezoid distortion of a camera, stitch images output from the plurality of cameras, and generate an image of a size of a display. The apparatus for sensing the object may calibrate a region in which a camera signal property is weak in the generated single image, and perform intensity compensation that normalizes pixel values.

In operation 430, the apparatus for sensing the object may extract object touch regions from an object image, and based on an object direction intended by a user, estimate an object touch region unintended by the user. The apparatus for sensing the object may remove the object touch region unintended by the user from the extracted object touch regions.

In operation 440, the apparatus for sensing the object may track the object touch region in a frame unit. The apparatus for sensing the object may track the object touch region extracted from the object image in a frame unit, and update information about the object touch region for each frame. The apparatus for sensing the object may track a movement of the object touch region based on the frame, and more readily estimate the object touch region. The apparatus for sensing the object may efficiently update a multi-touch of several users based on the frame via operations 410 through 440.

Figure 4B:
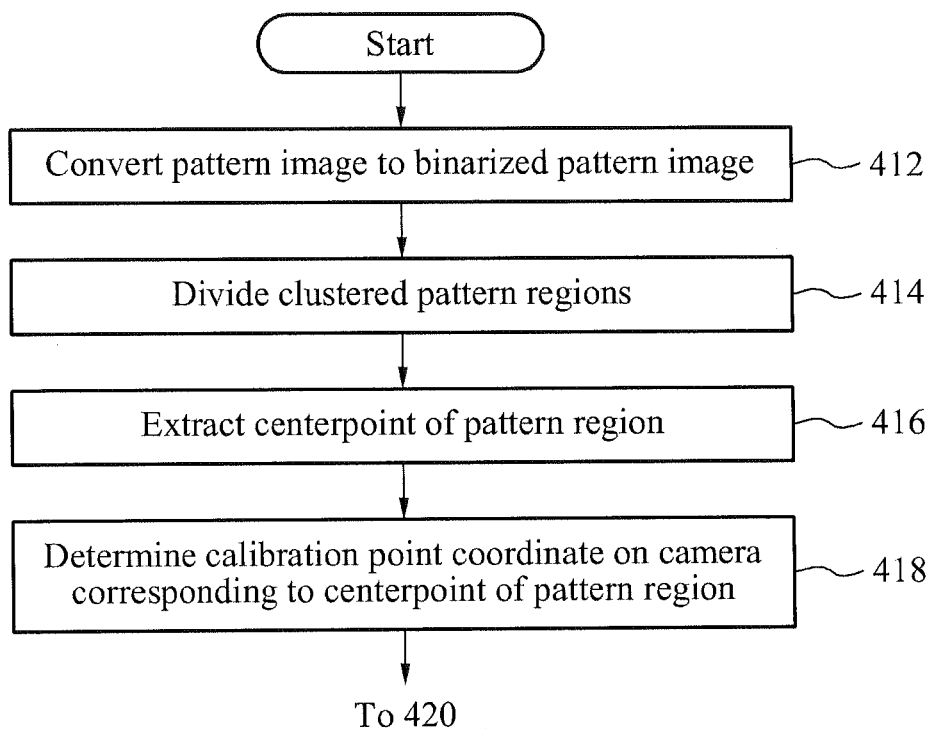

FIG. 4B illustrates pre-processing of operation 410 of FIG. 4A.

In operation 412, when a pattern image is output via a camera, the apparatus for sensing the object may convert the output pattern image into a binarized pattern image. In operation 414, when pattern regions are clustered together in the pattern image, the apparatus for sensing the object may divide the pattern regions clustered together through a morphological operation. The apparatus for sensing the object may efficiently extract a center point of the pattern regions by dividing the clustered pattern regions. In operation 416, the apparatus for sensing the object may extract the center point, for example, center coordinates, of the pattern regions. In operation 418, the apparatus for sensing the object may determine coordinates corresponding to the center point of a pattern blob to be calibration point coordinates on a camera. The apparatus for sensing the object may obtain a distortion map between the camera and a display surface by mapping the center coordinates, for example, camera calibration coordinates, of the pattern regions in a camera image to criterion coordinates of a calibration pattern included in the pattern layer on the display.

Figure 4C:
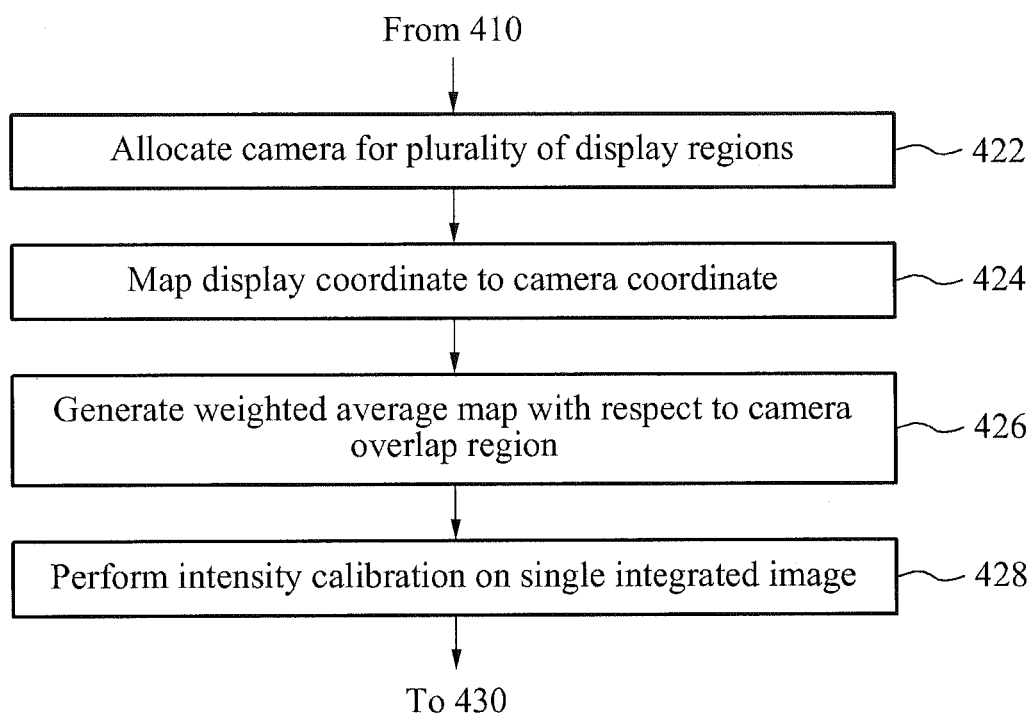

FIG. 4C illustrates processes of calibration and stitching of operation 420 of FIG. 4A.

In operation 422, the apparatus for sensing the object may allocate a camera for a plurality of display regions occupied by a display. In operation 424, the apparatus for sensing the object may obtain a distortion map for mapping coordinates on a display to coordinates on a camera. The apparatus for sensing the object may map remaining coordinates on the display to the coordinates on the camera based on the calibration point coordinates obtained in operation 410 and an interpolation method. In operation 426, the apparatus for sensing the object may generate a weighted average map with respect to a camera overlap region to use the camera overlap region. In operation 428, the apparatus for sensing the object may perform intensity compensation to normalize pixel values of an image integrated into one.

FIG. 4D illustrates a process of extracting an object touch region of operation 430 of FIG. 4A.

In operation 432, the apparatus for sensing the object may extract a background region from an object image. The apparatus for sensing the object may adaptively update the background region based on a change of an input image rather than a fixed background region.

A current background region may be updated based on Equation 1.

$$B_k(x,y)=B_{k-1}(x,y)+\text{beta}\times D_k(x,y) \quad [\text{Equation 1}]$$

In Equation 1, $B_k(x,y)$ denotes the current background region, and $B_{k-1}(x,y)$ denotes a previous background region with respect to the current background region. "Beta" denotes a weight with respect to the update of the background region, and $D_k(x,y)$ denotes a difference image. The apparatus for sensing the object may estimate a region invariable during a predetermined and/or desired period of time as a background region.

In operation 434, the apparatus for sensing the object may generate the difference image based on the estimated background region. The apparatus for sensing the object may generate the difference image by removing the background region estimated from an input image. In operation 436, the apparatus for sensing the object may extract an object touch region and an object adjacent region from the difference image.

The apparatus for sensing the object may adaptively determine a threshold value for extracting the object touch region based on a dynamic property in pixels in a plurality of cameras to efficiently extract the object touch region from a stitched image obtained by stitching output images of the plurality of cameras into one. The apparatus for sensing the object may adaptively determine the threshold value for extracting the object touch region, and uniformly extract the object touch region with respect to the plurality of cameras when an object passes through or overlaps a boundary surface of camera regions.

The apparatus for sensing the object may use an adaptive threshold method in which a threshold value for extracting an object touch region is adaptively determined based on a property of pixels in the plurality of cameras. The adaptive threshold method is represented by Equation 2.

$$T(x,y)=(I_{max}(x,y)-I_{min}(x,y))\times R \quad [\text{Equation 2}]$$

In Equation 2, $T(x,y)$ denotes an adaptive threshold value for extracting object touch regions at a (x,y) coordinates position. $I_{max}(x,y)$ denotes a maximum intensity of a pixel at the (x,y) coordinates, and $I_{min}(x,y)$ denotes a minimum intensity of a pixel at the (x,y) coordinates. "R" denotes a constant greater than "0" and less than "1".

The apparatus for sensing the object may verify whether the extracted object touch regions are valid. In operation 438, the apparatus for sensing the object may determine the object touch region unintended by the user from among the extracted object touch regions, and remove the determined object touch region.

Figure 5:
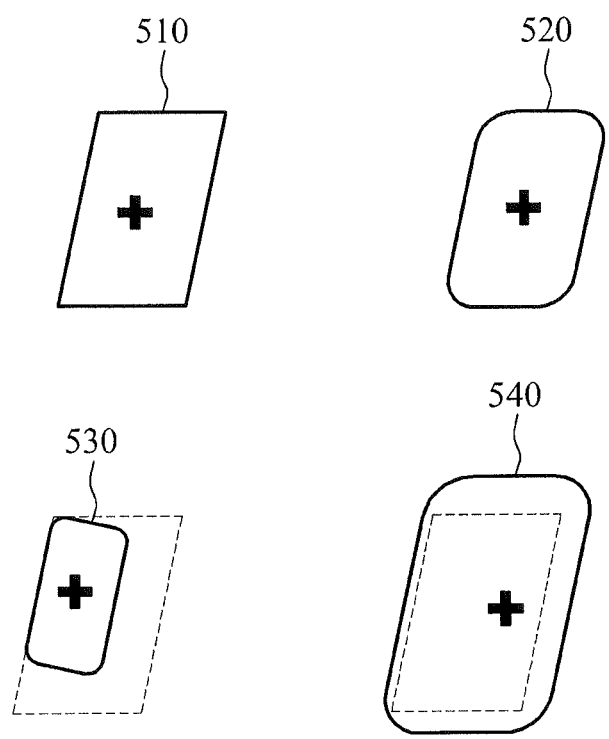
FIG. 5 illustrates examples of a pattern included in a pattern image according to an example embodiment.

FIG. 5 illustrates examples of a pattern included in a pattern image according to an example embodiment.

Referring to FIG. 5, pattern shapes within pattern images generated based on various types of brightness of a light source are illustrated. A pattern 510 represents an original pattern included in a pattern layer, and when a brightness of the light source is appropriate, a pattern, such as a pattern 520, similar to the original pattern, may be represented in the pattern image. When the brightness of the light source is considerably lower than predetermined and/or desired conditions, a portion of the pattern 510 is recognized, such as a pattern 530, and an erroneous camera calibration point, for example, a center point of a pattern region, may be obtained. The apparatus for sensing the object may increase the brightness of the light source or an exposure time of a camera when the pattern of the pattern image is represented as the pattern 530. When the brightness of the light source is considerably higher than predetermined and/or desired conditions, a region greater than a region of the pattern 510 is recognized as a pattern region, such as a pattern 540, and an erroneous calibration point may be obtained. The apparatus for sensing the object may lower the brightness of the light source or the exposure time of the camera when the pattern of the pattern image is represented as the pattern 540.

Figure 6:
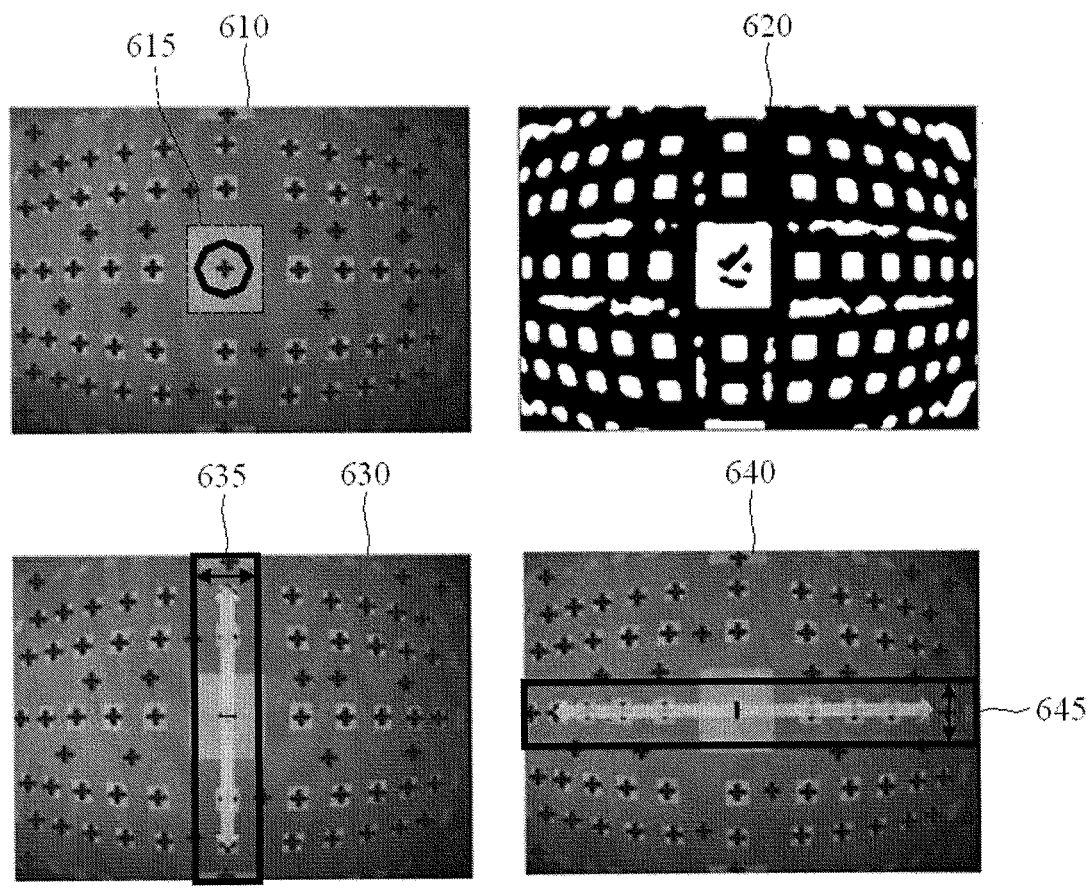
FIG. 6 illustrates a process of searching for camera criterion calibration coordinates from a pattern image according to an example embodiment.

FIG. 6 illustrates a process of searching for camera criterion calibration coordinates from a pattern image according to an example embodiment.

An apparatus for sensing an object may efficiently extract a calibration point from an image having a blur through use of a pattern in a form of a blob. The apparatus for sensing the object may readily extract a center point of a pattern region through a binarization process of an image from the image having the blur because the center point of the pattern region is generated in a form of a greatest blob to be used as a criterion point.

An image 610 illustrates an example of a pattern image generated by a camera. In the image 610, a pattern includes a criterion pattern 615 having a greater size than neighboring patterns. The center point extracted from the pattern region may be indicated as "+". An image 620 illustrates an example of a binarized pattern image. For example, the apparatus for sensing the object may convert a pattern image into a binarized pattern image based on a relaxation threshold method.

An image 630 illustrates an operation of identifying vertical criterion patterns 635 disposed in a vertical direction from the center point of the criterion pattern 615 in a pattern image. The apparatus for sensing the object may identify, in upward and downward directions from the center point of the criterion pattern 615, a predetermined and/or desired number of vertical criterion patterns 635. An image 640 illustrates an operation of identifying horizontal criterion patterns 645 disposed in a horizontal direction from a pattern image. The apparatus for sensing the object may identify, to left and right directions from the center point of the criterion pattern 615, a predetermined and/or desired number of horizontal criterion patterns 645.

Figure 7:
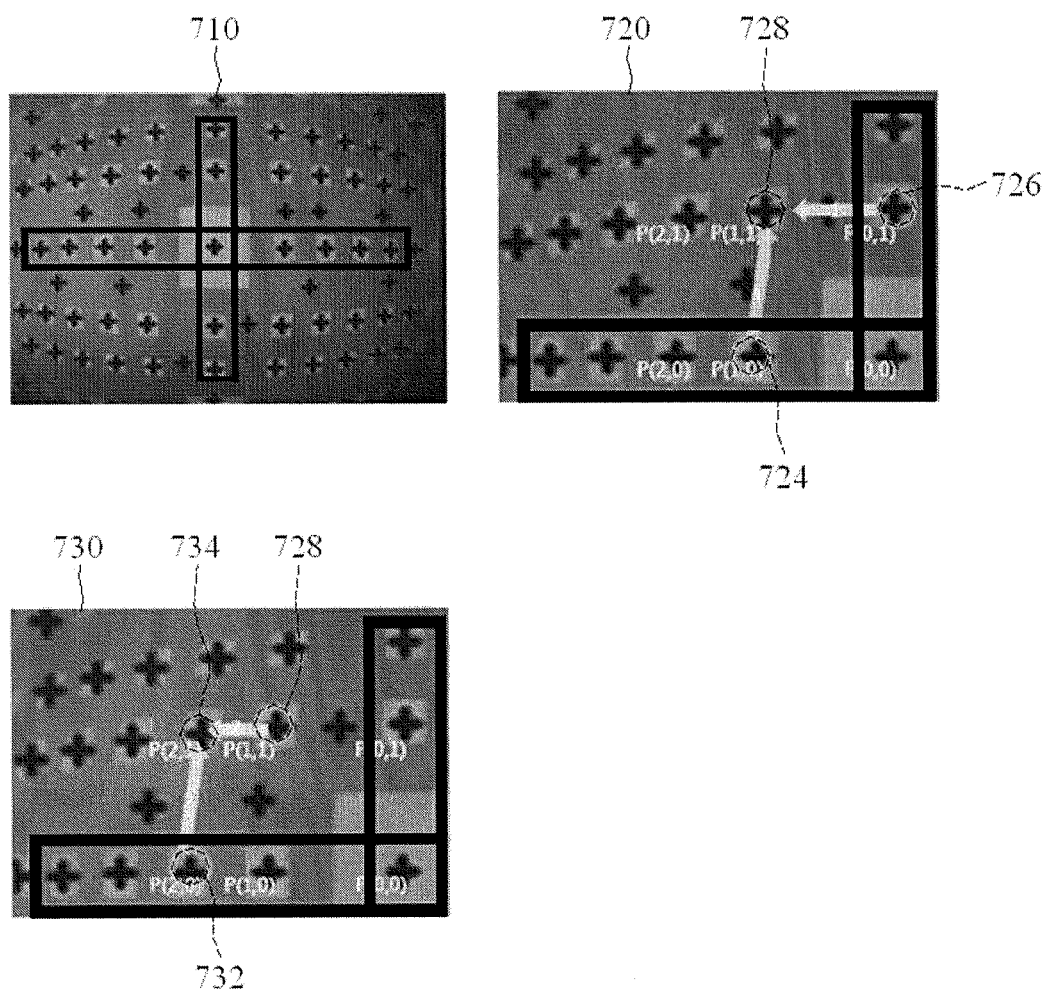
FIG. 7 illustrates a process of searching for remaining patterns based on criterion patterns in center vertical/horizontal directions according to an example embodiment.

FIG. 7 illustrates a process of searching for remaining patterns based on criterion patterns in center vertical/horizontal directions according to an example embodiment.

The apparatus for sensing the object may search for a position of patterns remaining subsequent to excluding a criterion pattern, vertical criterion pattern, and horizontal criterion pattern based on the vertical criterion pattern and the horizontal criterion pattern. In an image 710, the criterion pattern, the vertical criterion pattern, and the horizontal criterion pattern are identified in a pattern image. The apparatus for sensing the object may identify a position of a remaining pattern 728 based on a position of a vertical criterion pattern 726 and a position of a horizontal criterion pattern 724 identified as shown in an image 720. The apparatus for sensing the object may identify a position of an adjacent pattern 734 based on the position of the previously identified pattern 728 as shown in an image 730.

The apparatus for sensing the object may search for the position of the remaining patterns based on barrel distortion characteristic of calibration pattern image on cameras.

When a barrel distortion of a camera is evaluated, $P_x(x,y)$ and $P_y(x,y)$ satisfy Equation 3.

$$P_x(x,y) \geq P_x(x,y+1)$$

$$P_x(x,y) \geq P_x(x+1,y) \quad \text{[Equation 3]}$$

In Equation 3, $P_x(x,y)$ denotes coordinates on an "x" axis of $P(x,y)$, and $P_y(x,y)$ denotes coordinates on a "y" axis of $P(x,y)$.

Coordinates on the "x" axis of $P(x,y)$ have a value greater than coordinates on the "x" axis of $P(x, y+1)$, and coordinates on the "y" axis of $P(x,y)$ have a value greater than coordinates on the "y" axis of $P(x+1, y)$ due to the barrel distortion. For example, a position of patterns in a north-west region of the image 710 may be determined based on the Equation 3. The image 720 is an image which shows the north-west region of the image 710 in more detail.

Equation 3 indicates that, due to the barrel distortion, the higher in a vertical direction based on horizontal criterion patterns, the closer to a vertical criterion pattern the coordinates of patterns on the "x" axis approach, and the more distant in a horizontal direction based on vertical criterion patterns, the closer to a horizontal criterion pattern the coordinates of patterns on the "y" axis approach. Accordingly, a distribution of the patterns included in the pattern image may have a form of a barrel.

Figure 8:
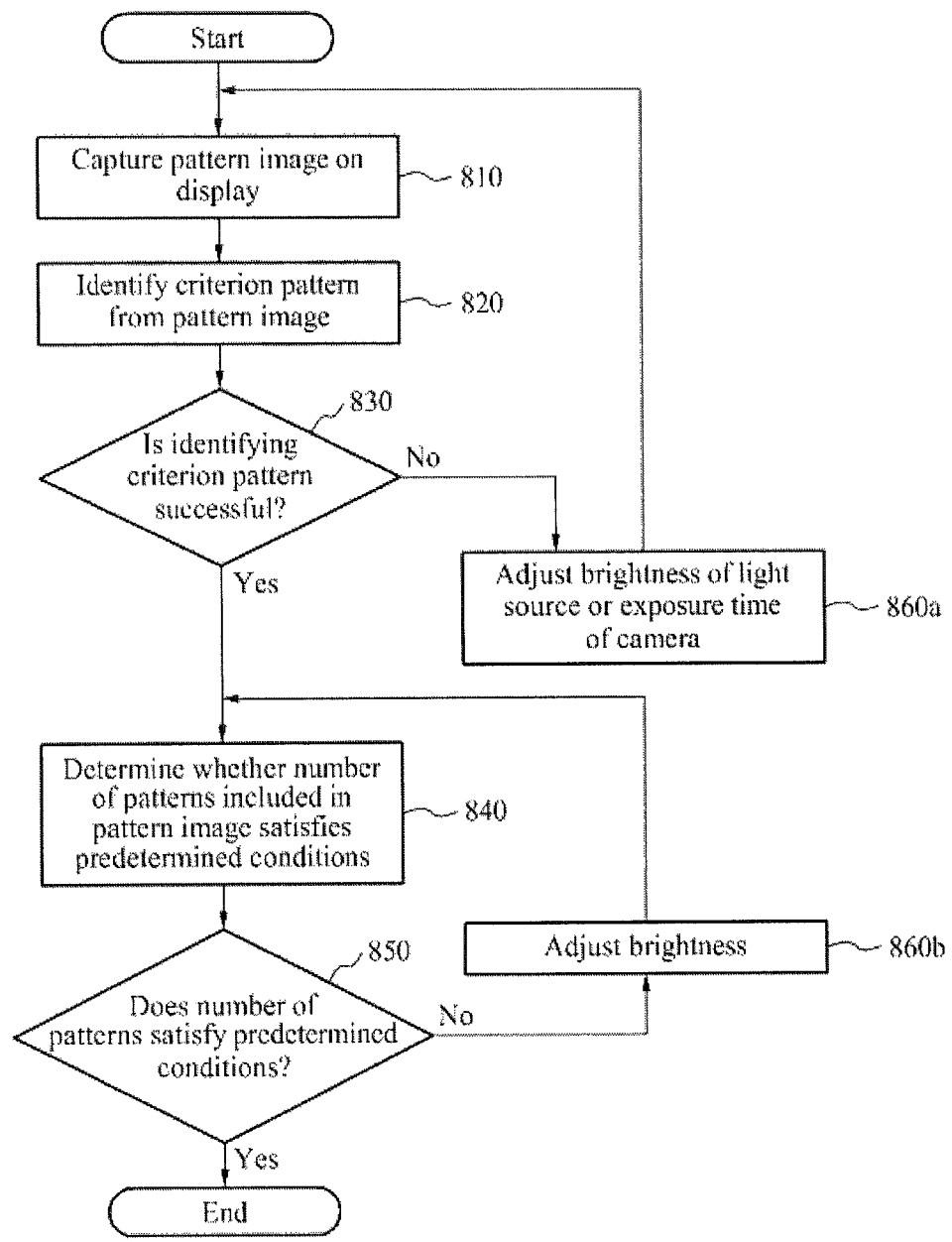
FIG. 8 illustrates a method in which an apparatus for sensing an object identifies a calibration pattern according to an example embodiment.

FIG. 8 illustrates a method in which an apparatus for sensing an object identifies a calibration pattern according to an example embodiment.

In operation 810, the apparatus for sensing the object may capture a pattern image on a display. The pattern image is generated through a light output from a light source being reflected off of a pattern of the display and input to a camera.

The apparatus for sensing the object may determine whether the pattern displayed in the pattern image satisfies predetermined and/or desired conditions, and when the pattern displayed in the pattern image does not satisfy the predetermined and/or desired conditions, adjust at least one of a brightness of the light source emitting the light and an exposure time of the camera. Hereinafter, throughout operations 820 through 860, the method in which the apparatus for sensing the object according to example embodiments identifies the calibration pattern based on a criterion pattern will be described.

In operation 820, the apparatus for sensing the object may identify a criterion pattern from a pattern image obtained by capturing a pattern for identifying a position on a display. The apparatus for sensing the object may convert the pattern image into a binarized pattern image, and based on a size of a pattern region displayed on the binarized pattern image, identify a criterion pattern having a greatest size when compared to other patterns. As an example, the apparatus for sensing the object may identify a first largest pattern having a greatest size from among patterns displayed in the pattern image, and identify a second largest pattern having a greatest size from among patterns remaining subsequent to excluding the first largest pattern. The apparatus for sensing the object may determine whether a size ratio between the first largest pattern and the second largest pattern satisfies predetermined and/or desired conditions, and determine whether the first largest pattern is the criterion pattern.

In operation 830, the apparatus for sensing the object may determine whether the criterion pattern is identified from the pattern image. When the criterion pattern is unidentified, the apparatus for sensing the object may adjust at least one of a brightness of a light source emitting light and an exposure time of a camera in operation 860*a*. When the criterion pattern is unidentified, the apparatus for sensing the object may increase the brightness of the light source, or increase the exposure time of the camera.

When the criterion pattern is identified from the pattern image, the apparatus for sensing the object may determine whether a number of patterns included in the pattern image satisfies predetermined and/or desired conditions in operation 840. The apparatus for sensing the object may identify a pattern of the predetermined and/or desired number from among patterns disposed in a vertical direction and a horizontal direction centered at the criterion pattern.

In operation 850, the apparatus for sensing the object may end a calibration process or perform operation 860 based on whether a number of patterns displayed in the pattern image satisfies predetermined and/or desired conditions. When the number of patterns displayed in the pattern image does not satisfy the predetermined and/or desired conditions, the apparatus for sensing the object may adjust at least one of the brightness of the light source emitting the light and the exposure time of the camera in operation 860*b*. The apparatus for sensing the object may increase the brightness of the light source or increase the exposure time of the camera when a predetermined and/or desired number of patterns is unidentified from among the patterns disposed in the vertical direction and the horizontal direction centered at the criterion pattern. The apparatus for sensing the object may increase the brightness of the light source and increase the exposure time of the camera simultaneously.

According to other example embodiments, the apparatus for sensing the object may determine whether at least one of the number of the patterns included in the pattern image, a distribution of the patterns displayed in the pattern image, a resolution of the patterns, and a shape of the patterns satisfies predetermined and/or desired conditions in operation 840. For example, the apparatus for sensing the object may determine that the predetermined and/or desired conditions are not satisfied when the distribution of the patterns does not satisfy predetermined and/or desired conditions, the resolution of the patterns is determined to be lower than predetermined and/or desired conditions, or a distortion of the shape of the patterns is greater than predetermined and/or desired conditions. When the predetermined and/or desired conditions are not satisfied, the apparatus for sensing the object may adjust at least one of the brightness of the light source and the exposure time of the camera in operation 860. The apparatus for sensing the object may re-capture a pattern image on the display based on at least one of the adjusted brightness of the light source and the exposure time of the camera. The apparatus for sensing the object may identify a criterion pattern from patterns in the re-captured pattern image, and re-determine whether the patterns in the re-captured pattern image satisfy the predetermined and/or desired conditions. The apparatus for sensing the object may iterate operations 810 through 860 until the patterns displayed in the pattern image satisfy the predetermined and/or desired conditions.

Figure 9:
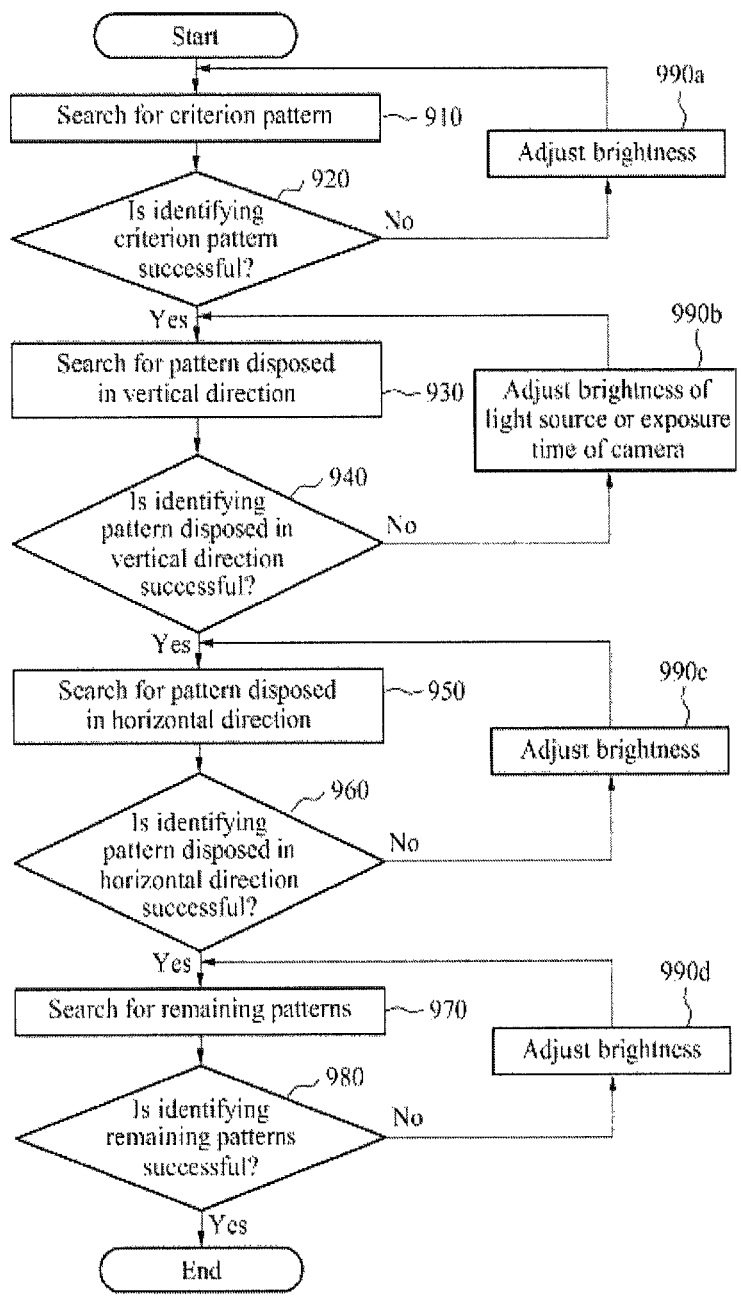
FIG. 9 illustrates a method of searching for camera criterion calibration patterns from a calibration pattern image on a display surface of an apparatus for sensing an object according to an example embodiment.

FIG. 9 illustrates a method of searching for camera criterion calibration patterns from a calibration pattern image on a display surface of an apparatus for sensing an object according to an example embodiment.

In operation 910, the apparatus for sensing the object may search for a criterion pattern from a pattern image. For example, the apparatus for sensing the object may search for a pattern having a greatest size, for example, a first largest pattern, searches for a pattern of a second greatest size, for example, a second largest pattern, from the pattern image, and when the size of the first largest pattern is greater than the size of the second largest pattern by "k" multiples, "k" being a predetermined and/or desired number, determine the first largest pattern to be the criterion pattern.

In operation 920, the apparatus for sensing the object may determine whether the criterion pattern is identified. When the criterion pattern is unidentified, the apparatus for sensing the object may adjust a brightness of a light source and an exposure time of a camera in operation 990*a*, and re-search for the criterion pattern in operation 910.

When the criterion pattern is identified, the apparatus for sensing the object may search for vertical criterion patterns disposed in a vertical direction of the criterion pattern in operation 930.

In operation 940, the apparatus for sensing the object may determine whether the vertical criterion patterns are identified. When the vertical criterion patterns are unidentified, the apparatus for sensing the object may adjust the brightness of the light source or the exposure time of the camera in operation 990*b*, and re-search for the vertical criterion patterns in operation 930.

When the vertical criterion pattern is identified, the apparatus for sensing the object may search for horizontal criterion patterns disposed in a horizontal direction of the criterion pattern in operation 950.

In operation 960, the apparatus for sensing the object may determine whether the horizontal criterion patterns are identified. When the horizontal criterion patterns are unidentified, the apparatus for sensing the object may adjust the brightness of the light source or the exposure time of the camera in operation 990*c*, and re-perform a search for the horizontal criterion patterns in operation 950.

When the horizontal criterion pattern is identified, the apparatus for sensing the object may search for patterns remaining subsequent to excluding the criterion pattern, the vertical criterion pattern, and the horizontal criterion pattern in operation 970.

In operation 980, the apparatus for sensing the object may determine whether the remaining patterns are identified. When the remaining patterns are unidentified, the apparatus for sensing the object may adjust the brightness of the light source or the exposure time of the camera in operation 990*d*, and re-perform a search for remaining criterion patterns in operation 970.

In operations 930, 950, and 970, the apparatus for sensing the object may search for a pattern by comparing a number of patterns pre-defined with respect to a camera view region to a number of patterns of a pattern image captured by an actual camera. During a process of identifying the pattern, the apparatus for sensing the object may determine whether identifying the pattern is successful based on symmetry of patterns included in a pattern layer or a distortion model of a lens provided within a camera, aside from verifying whether a number of patterns displayed in a binarized pattern image satisfies predetermined conditions.

According to other example embodiments, operation 950 of searching for the horizontal criterion pattern is performed prior to operation 930 of searching for the vertical criterion pattern. The apparatus for sensing the object may adjust the brightness of the light source or the exposure time of the camera, and obtain optimum and/or desired calibration point coordinates for a plurality of cameras.

Figure 10:
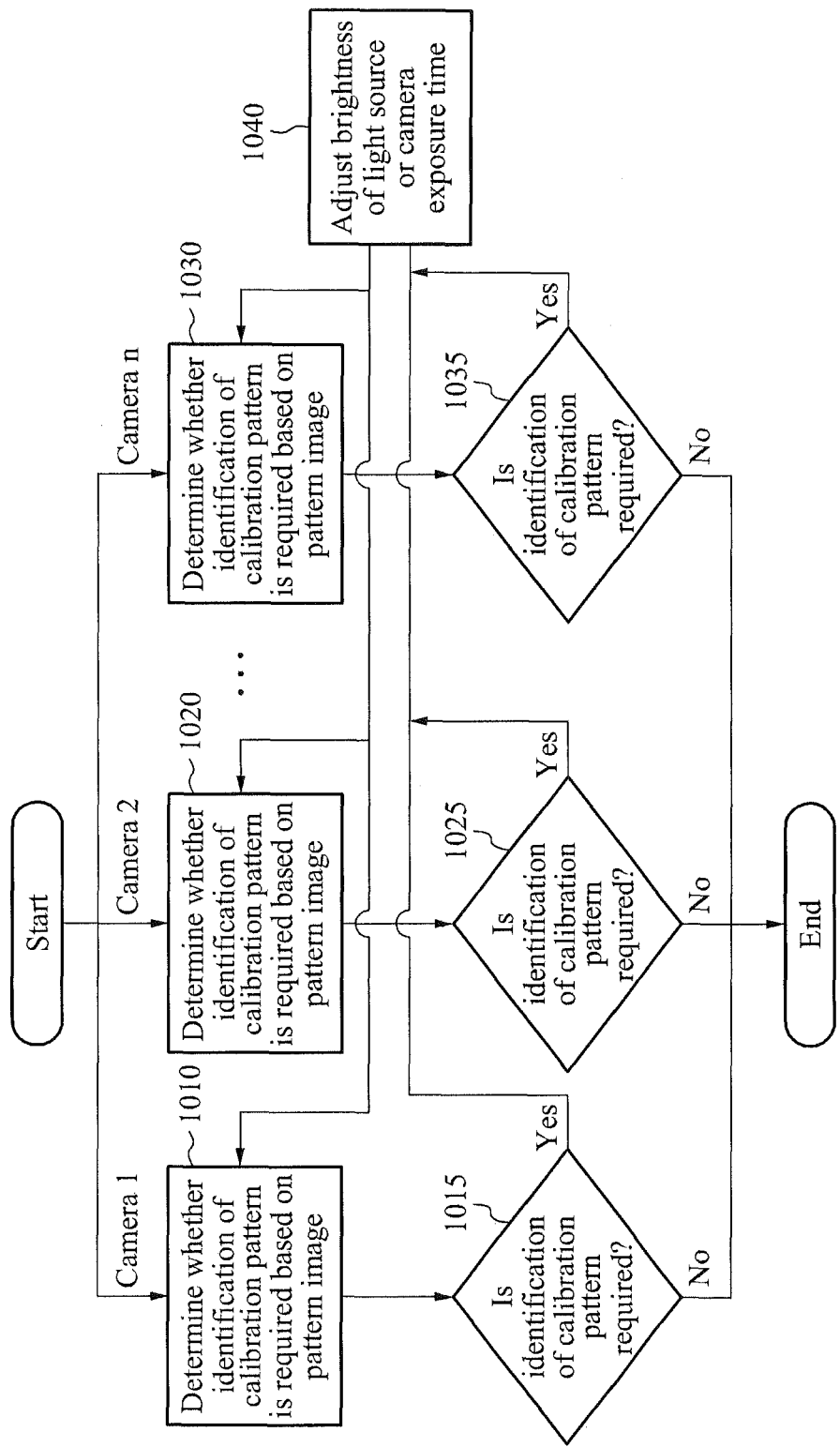
FIG. 10 illustrates a method of searching for camera criterion calibration patterns from a calibration pattern image on a display surface with reference to plurality of cameras in parallel according to an example embodiment.

FIG. 10 illustrates a method of searching for camera criterion calibration patterns from a calibration pattern image on a display surface with criterion to plurality of cameras, for example, camera 1, camera 2, . . . , camera "n", in parallel according to an example embodiment. In operations 1010, 1020, and 1030, an apparatus for sensing an object may determine whether a light source or a camera exposure time is required to be adjusted with respect to a plurality of cameras based on a pattern image output by cameras included in the apparatus for sensing the object.

In operations 1015, 1025, and 1035, the apparatus for sensing the object may adjust the light source or the camera exposure time in operation 1040, or end a calibration process based on a result of the determination in operations 1010, 1020, and 1030. The apparatus for sensing the object may determine whether a process of adjusting the light source or the camera exposure time is necessary for the plurality of cameras, and determine brightness conditions required for obtaining optimum and/or desired criterion calibration coordinates to be applied to the plurality of cameras. When a calibration pattern identification process is ended, subsequent to successfully satisfying requirements for the calibration pattern identification in operations 1015, 1025, and 1035 in a predetermined and/or desired light source, the calibration pattern identification process may not be re-performed on a corresponding camera in a subsequent operation. In the subsequent operation, the calibration pattern identification process may be performed on cameras that do not satisfy the operations 1015, 1025, and 1035.

Figure 11:
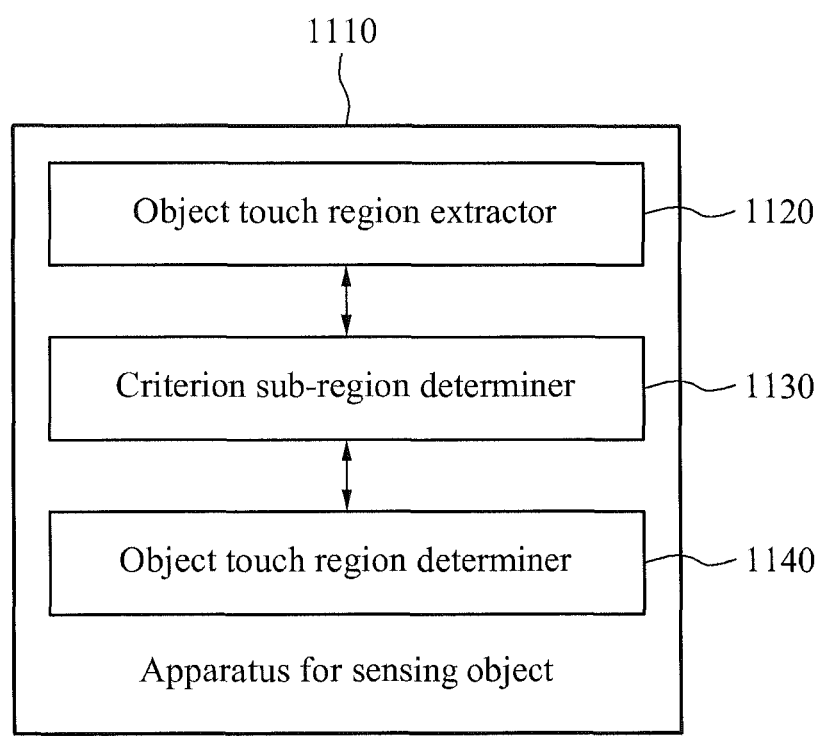
FIG. 11 illustrates a configuration of an apparatus for sensing an object according to another example embodiment.

FIG. 11 illustrates a configuration of an apparatus 1110 for sensing an object according to another example embodiment.

The apparatus 1110 for sensing the object may determine an object touch region intended by a user from an object image including an object touch region. For example, the apparatus 1110 for sensing the object may identify a touch region of an object touched by a finger of the user on a display in an object image captured by a camera.

A distortion may occur due to an object adjacent region in an overlap region of an object image captured by a plurality of cameras. The object adjacent region displayed on the overlap region may generate a distortion during a process of stitching object images generated by the plurality of cameras. The apparatus 1110 for sensing the object may search for the object touch region intended by the user by removing an unintended object touch region occurring due to such distortion.

Referring to FIG. 11, the apparatus 1110 for sensing the object includes an object touch region extractor 1120, a criterion sub-region determiner 1130, and an object touch region determiner 1140.

The object touch region extractor 1120, the criterion sub-region determiner 1130, and the object touch region determiner 1140 may be hardware, firmware, hardware executing software or any combination thereof. When at least one of the object touch region extractor 1120, the criterion sub-region determiner 1130, and the object touch region determiner 1140 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the object touch region extractor 1120, the criterion sub-region determiner 1130, and the object touch region determiner 1140.

In the event where at least one of the object touch region extractor 1120, the criterion sub-region determiner 1130, and the object touch region determiner 1140 is a processor executing software, the processor is configured as a special purpose machine to execute the software to perform the functions of the at least one of the object touch region extractor 1120, the criterion sub-region determiner 1130, and the object touch region determiner 1140. In such an embodiment, the processor may include one or more Central Processing Units (CPUs), digital signal processors (DSPs), application-specific-integrated-circuits (ASICs), field programmable gate arrays (FPGAs) computers.

The object touch region extractor 1120 may extract the object touch region from the object image obtained by capturing an object. The object touch region extractor 1120 may estimate a background region absent a motion during a predetermined and/or desired period of time in the object image obtained by capturing the object. The object touch region extractor 1120 may generate a difference image by subtracting the background region from the object image. The object touch region extractor 1120 may extract the object touch region from regions remaining subsequent to excluding the background region from the object image. As an example, the object touch region extractor 1120 may extract the object touch region by extracting a salient region associated with a touch blob from an image through at least one of a filtering process, such as Gaussian filtering, median filtering, and high-pass filtering, and an amplification process.

The object touch region extractor 1120 may adaptively determine a threshold value for extracting the object touch region based on a unique property of a camera generating an object image. As an example, the object touch region extractor 1120 may adaptively determine a threshold value for extracting the object touch region for a plurality of pixels based on a maximum intensity property and a minimum intensity property of the plurality of pixels included in the camera.

The criterion sub-region determiner 1130 may divide the object image into a plurality of sub-regions, and determine a criterion sub-region from among the plurality of sub-regions. The criterion sub-region determiner 1130 may determine a sub-region including a greatest object touch region from among the plurality of divided sub-regions to be the criterion sub-region. The criterion sub-region determiner 1130 may determine a directivity of the object touch region based on a position of the criterion sub-region.

When a plurality of sub-regions including the greatest touch region is provided, the criterion sub-region determiner 1130 may rotate, to a degree of a predetermined and/or desired angle, the plurality of divided sub-regions centered at a center point of an object adjacent region displayed in the object image. The criterion sub-region determiner 1130 may determine the criterion sub-region, and the directivity of the object touch region based on a number of object touch regions included in the plurality of rotated sub-regions.

The object touch region determiner 1140 may determine whether to remove the object touch region displayed in the object image based on the object touch region included in the criterion sub-region. The object touch region determiner 1140 may determine the object touch region to remove based on the directivity of the object touch region. The object touch region determiner 1140 may determine the directivity of the object touch region included in the criterion sub-region based on the object touch region included in the criterion sub-region and the center point of the object adjacent region displayed in the object image. The object touch region determiner 1140 may determine conditions to be applied to the object image based on the directivity of the object touch region included in the criterion sub-region. As an example, the object touch region determiner 1140 may determine the object touch region reverse to the directivity of the object touch region, and determine the object touch region reverse to the directivity of the object touch region to be the object touch region to be removed based on a discriminant.

The object touch region determiner 1140 may determine whether to remove the object touch region displayed in the object image based on a distance between the center point of the object adjacent region displayed in the object image and the center point of the object touch region included in the criterion sub-region. The apparatus 1110 for sensing the object may compare an average distance value "ave_dist" obtained by averaging distances between center points of object touch regions included in the criterion sub-region and a center point of an object adjacent region to a distance "a_dist" between object touch regions reverse to the directivity of the object touch region and the center point of the object adjacent region, and determine whether to remove the object touch region. As an example, when "a_dist" value is greater than a value obtained by dividing "ave_dist" by a predetermined and/or desired constant, the apparatus 1110 for sensing the object may determine to maintain the object touch region reverse to the directivity of the object touch region.

When the regions between the adjacent object touch regions are all included in the object adjacent region from among the object touch regions included in the criterion sub-region, the object touch region determiner 1140 may determine to remove object touch regions remaining subsequent to excluding an object touch region most remote from the center point of the object adjacent region from among neighboring object touch regions.

According to other example embodiments, when the regions in between the adjacent object touch regions are all included in the object adjacent region, the object touch region determiner 1140 may determine the object touch region to be removed based on an angle obtained between the center point of the object adjacent region and the position of the adjacent object touch regions. As an example, the object touch region determiner 1140 may determine to maintain the object touch region despite not corresponding to the object touch region most remote from the center point of the object adjacent region when the angle obtained between the center point of the object adjacent region and the position of the adjacent object touch regions is greater than a predetermined and/or desired angle.

The object touch region determiner 1140 may remove, from the object image, the object touch region ultimately determined to be removed. The object touch region determiner 1140 may remove object touch regions unintended by the user from among object touch regions included in the object image.

Figure 12:
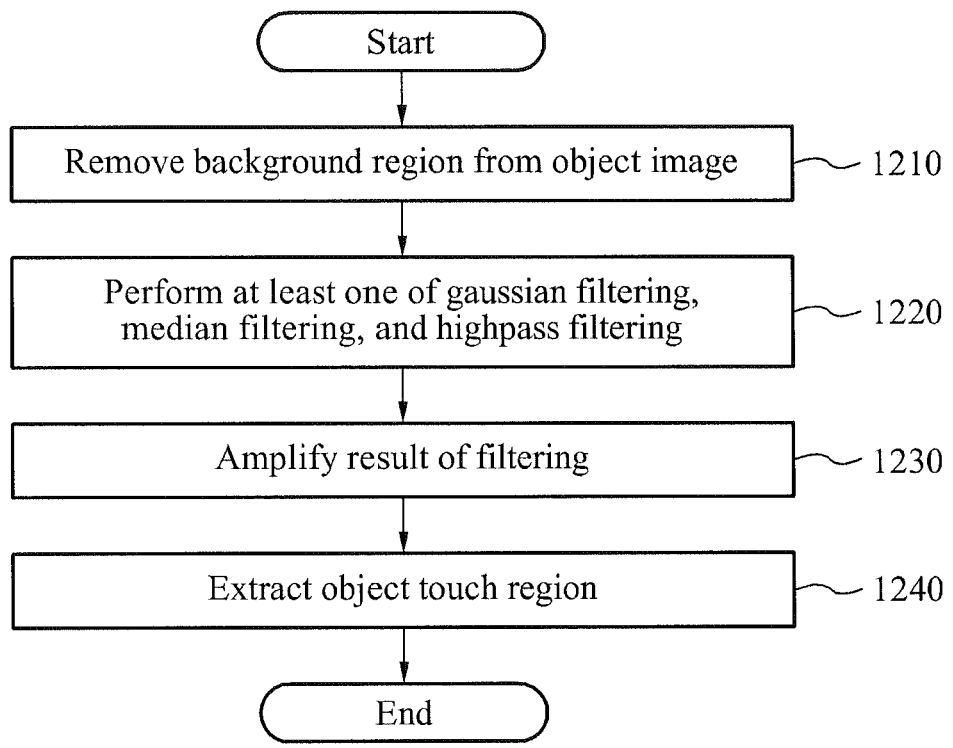
FIG. 12 illustrates a process of extracting an object touch region from an object image according to an example embodiment.

FIG. 12 illustrates a process of extracting an object touch region from an object image according to an example embodiment.

In operation 1210, an apparatus for sensing an object may extract a background region from an object image, and generate a difference image by removing the background region from the object image.

In operation 1220, the apparatus for sensing the object may perform at least one of Gaussian filtering, median filtering, and high-pass filtering on the difference image.

In operation 1230, the apparatus for sensing the object may amplify a result of filtering with respect to an image on which the filtering is performed in operation 1220.

In operation 1240, the apparatus for sensing the object may readily extract object touch regions by extracting a salient region associated with a touch blob from the image on which the filtering and the amplifying are performed.

Figure 13:
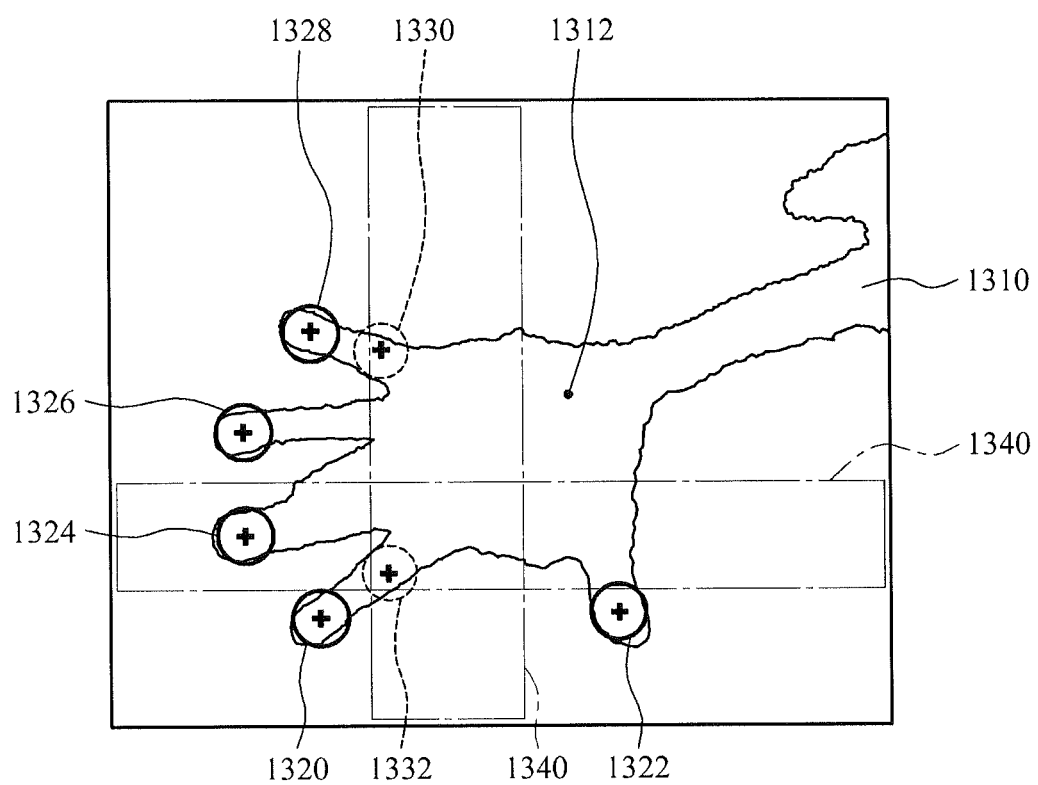
FIG. 13 illustrates an example of an object image subsequent to calibration and stitching processes being performed according to an example embodiment.

FIG. 13 illustrates an example of an object image subsequent to calibration and stitching processes being performed according to an example embodiment. Referring to FIG. 13, an object image obtained by capturing a hand of a user touching a display is illustrated, and object touch regions 1320, 1322, 1324, 1326, 1328, 1330, and 1332, an object adjacent region 1310, and a center point 1312 of the object adjacent region 1310 are illustrated.

An image with respect to the object adjacent region 1310 may be distorted during a process of images captured in an overlap region of a camera being stitched to a single image. The object touch regions 1320 through 1328 refer to object touch regions intended by the user. However, the object touch regions 1330 and 1332 are object touch regions erroneously extracted due to the distortion of the image, and refer to object touch regions unintended by the user. The apparatus for sensing the object may recognize a control instruction of the user by removing the unintended object touch regions 1330 and 1332 from the object image.

The object image of FIG. 13 includes four camera regions, and a captured object overlaps a boundary region of the four camera regions. A region 1340 encompassed by a dashed line in FIG. 13 refers to a region in which the four camera regions overlap. The object touch regions 1330 and 1332 unintended by the user may be generated due to a frustrated hover image in the overlap region. When the object overlaps the boundary of the camera regions, the adaptive threshold method of Equation 2 may be used to uniformly extract an object touch region and an object adjacent region.

Figure 14A:
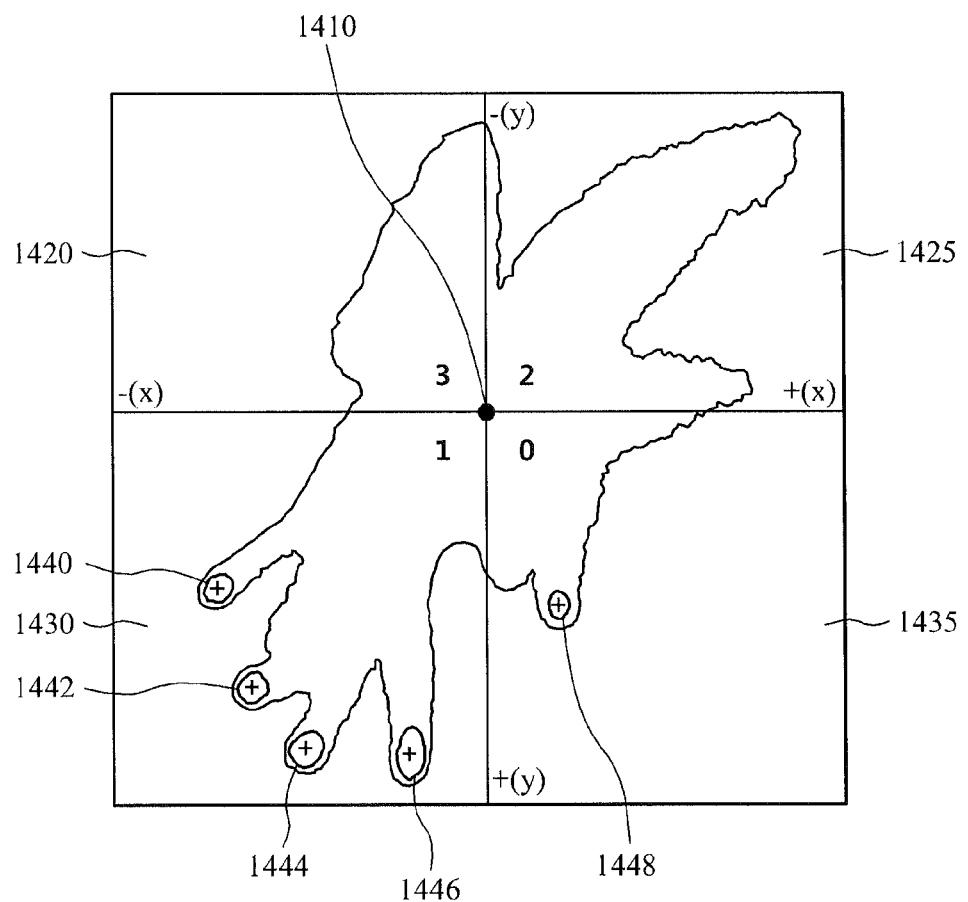
FIGS. 14A and 14B illustrate a process of determining a directivity of an object touch region according to an example embodiment.
Figure 14B:
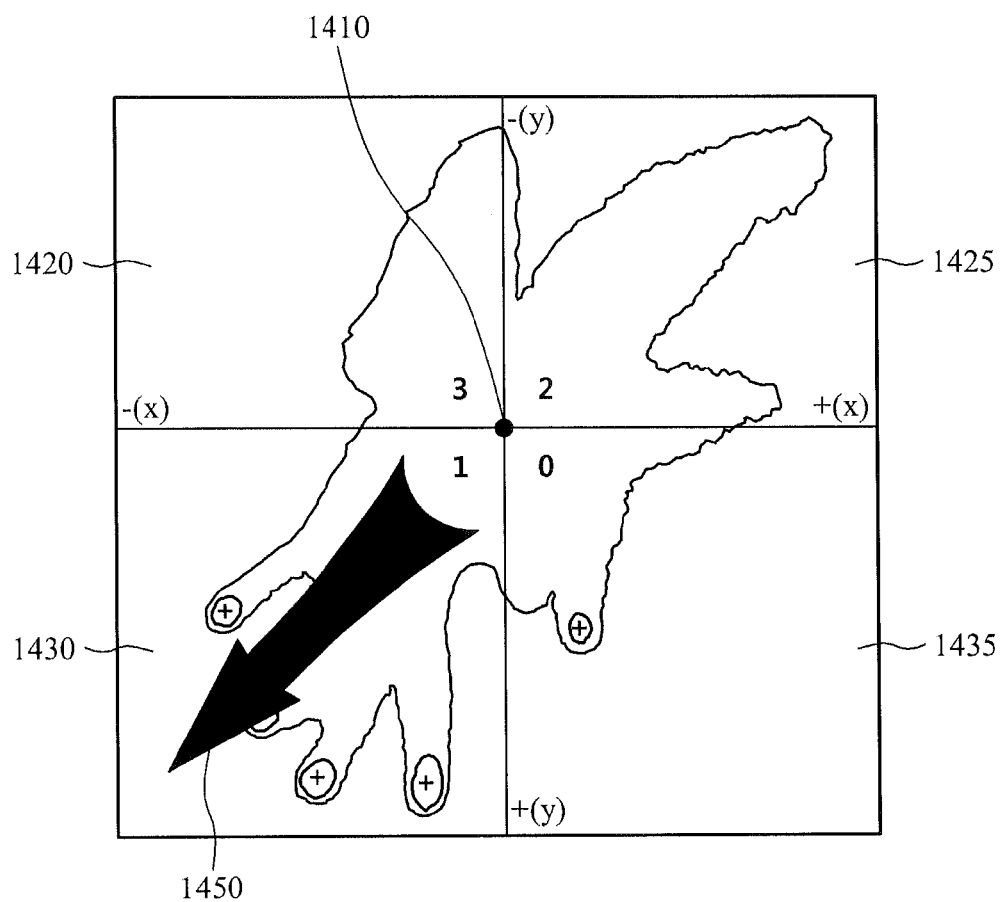

FIGS. 14A and 14B illustrate a process of determining a directivity of an object touch region according to example embodiments.

Referring to FIG. 14A, an apparatus for sensing an object may extract object touch regions 1440, 1442, 1444, 1446, and 1448 from an object image, and divide the object image into a plurality of sub-regions 1420, 1425, 1430, and 1435. Alternatively, the apparatus for sensing the object may extract the object touch regions 1440, 1442, 1444, 1446, and 1448 subsequent to dividing the object image into the plurality of sub-regions 1420, 1425, 1430, and 1435. The apparatus for sensing the object may divide the object image into the plurality of sub-regions 1420, 1425, 1430, and 1435 based on a center point 1410 of an object adjacent region displayed in the object image. The apparatus for sensing the object may determine a sub-region including a greatest object touch region from among the plurality of divided sub-regions 1420, 1425, 1430, and 1435 to be a criterion sub-region, and determine a directivity of object touch regions belonging to the object adjacent region. The sub-region 1430 including the four object touch regions 1440, 1442, 1444, and 1446 may be determined to be the criterion sub-region.

Referring to FIG. 14B, when the criterion sub-region is determined, the apparatus for sensing the object may determine a directivity 1450 of the object touch region based on the center point 1410 of the object adjacent region displayed in the object image. The apparatus for sensing the object may distinguish object touch regions unintended by the user based on the directivity of the object touch region.

Figure 15A:
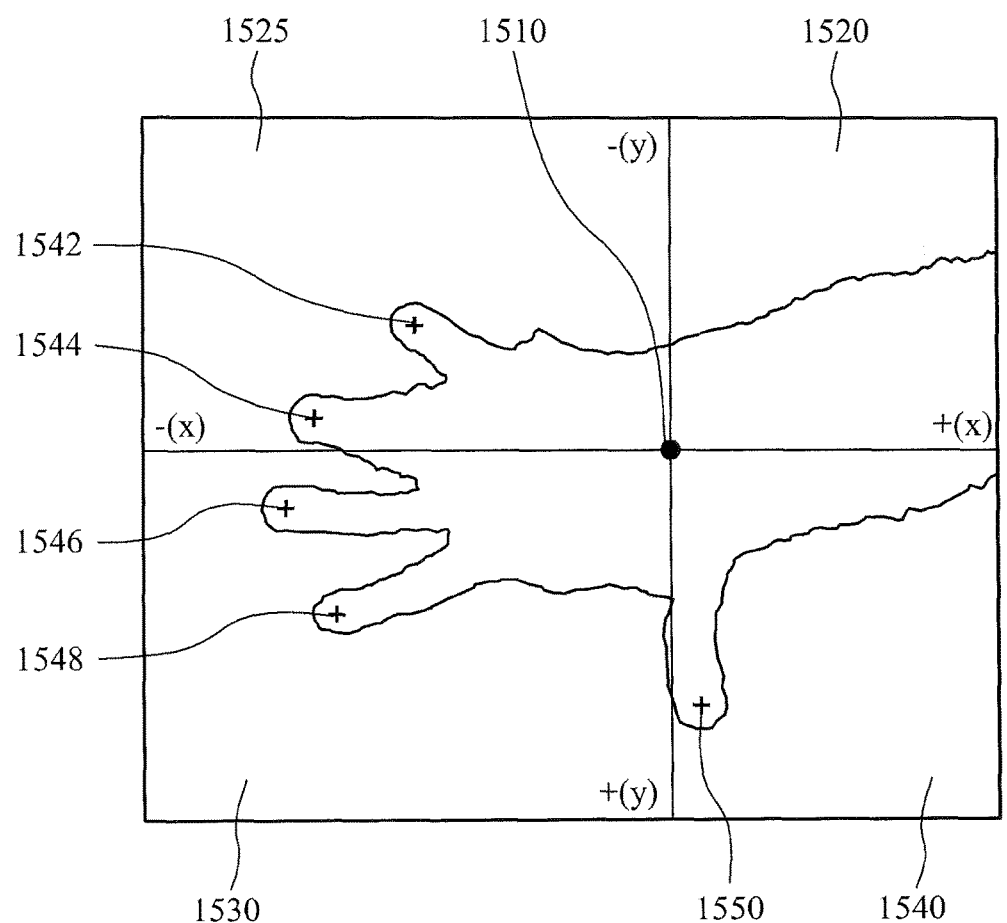

FIGS. 15A and 15B illustrate a process of determining a directivity of an object touch region according to other example embodiments.

When a plurality of sub-regions including a maximum number of object touch regions exists in sub-regions 1520, 1525, 1530, and 1540 obtained by dividing an object image, determining a directivity of an object touch region may be difficult. The apparatus for sensing the object may rotate coordinates of object touch regions 1542, 1544, 1546, 1548, and 1550 in a predetermined and/or desired angle, and based on the rotated object touch regions, re-perform a search for the directivity of the object touch region.

The apparatus for sensing the object may move coordinates of the object touch regions 1542, 1544, 1546, 1548, and 1550 to coordinates having a center point 1510 in an object adjacent region as a zero point, and rotate the coordinates of the object touch regions 1542, 1544, 1546, 1548, and 1550 using a two-dimensional (2D) rotation matrix. The apparatus for sensing the object may determine the directivity of the object touch region based on a number of the object touch regions included in the plurality of sub-regions.

As an example, the apparatus for sensing the object may rotate, by 45 degrees, the coordinates of the object touch regions 1542, 1544, 1546, 1548, and 1550, setting the center point 1510 of the object adjacent region to be the zero point. As shown in FIG. 15B, the apparatus for sensing the object may rotate a coordinate axis by 45 degrees centered at the center point 1510 of the object adjacent region, and identify the coordinates of the object touch regions 1542, 1544, 1546, 1548, and 1550 based on the rotated coordinate axis. The apparatus for sensing the object may determine a directivity 1560 of object touch regions in new coordinates being rotated by 45 degrees based on the object touch regions 1542, 1544, 1546, 1548, and 1550 rotated by 45 degrees.

Figure 16:
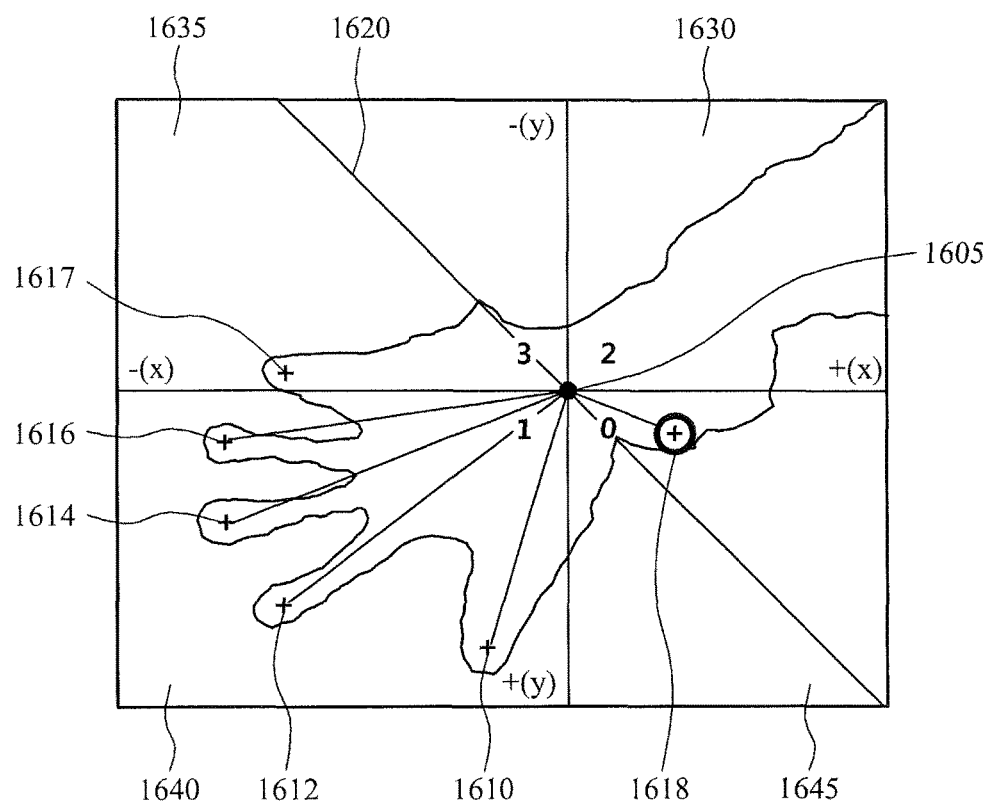
FIG. 16 illustrates a process of determining whether to remove an object touch region according to an example embodiment.

FIG. 16 illustrates a process of determining whether to remove an object touch region according to an example embodiment.

Referring to FIG. 16, sub-regions 1630, 1635, 1640, and 1645 obtained by dividing an object image and extracted object touch regions 1610, 1612, 1614, 1616, 1617, and 1618 are illustrated. When the object touch region 1618 is assumed to be an object touch region generated unintentionally by clothing of a user, the object touch region may remove the unintended object touch region based on a directivity of object touch regions.

The apparatus for sensing the object may determine the sub-region 1640 including the object touch regions 1610, 1612, 1615, and 1616 to be a criterion sub-region, and determine the directivity of the object touch regions based on a position of the criterion sub-region. As an example, when a directivity of the sub-region 1640 corresponds to a south-west (SW) region based on a center point 1605 of an object adjacent region, the apparatus for sensing the object may determine the directivity of the object touch regions to be SW, for example, the directivity of the criterion sub-region.

The apparatus for sensing the object may determine a discriminant criterion line 1620 based on the directivity of the object touch areas, and remove the object touch region 1618 disposed on a reverse side of the object touch regions 1610, 1612, 1614, and 1616 included in the criterion sub-region 1640 based on the discriminant criterion line 1620. As an example, the discriminant criterion line 1620 may be represented by a discriminant "y−x<0", and the apparatus for sensing the object may remove the object touch region 1618 satisfying the discriminant. A case in which the object touch region satisfying the discriminant is not to be removed may exist during a process of removing the unintended object touch region based on the discriminant.

The apparatus for sensing the object may determine whether to remove the object touch region based on a distance between the center points of the object touch regions 1610, 1612, 1614, and 1616 included in the sub-region region 1640 and the center point 1605 of the object adjacent region. As an example, the apparatus for sensing the object may calculate an average distance value "ave_dist" by averaging distances between the center points of the object touch regions 1610, 1612, 1614, and 1616 included in the sub-region region 1640 and the center point 1605 of the object adjacent region. The apparatus for sensing the object may calculate the distance between the object touch region satisfying the discriminant and the center point 1605 of the object adjacent region, and when the distance is greater than a result of dividing the average distance value "ave_dist" by a predetermined and/or desired constant, the object touch region satisfying the discriminant may not be removed.

The apparatus for sensing the object may determine the object touch region to be removed based on the distance between the center points of the object touch regions 1610, 1612, 1614, and 1616 included in the sub-region region 1640 and the center point 1605 of the object adjacent region. Although a predetermined and/or desired object touch region satisfies the discriminant that determines whether to remove the object touch region, the apparatus for sensing the object may determine not remove the object touch region and maintain the object touch region. Through such a method, the apparatus for sensing the object may distinguish the object touch region to be removed.

Figure 17:
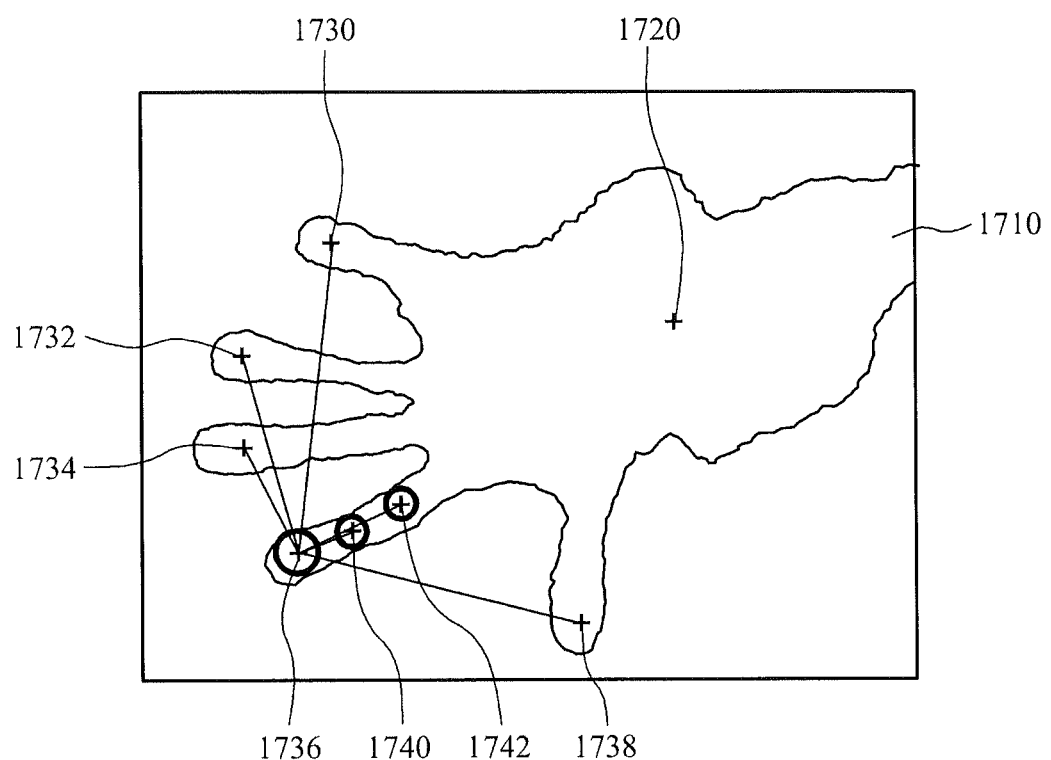
FIG. 17 illustrates a process of determining whether to remove an object touch region according to another example embodiment.

FIG. 17 illustrates a process of determining whether to remove an object touch region according to another example embodiment.

An apparatus for sensing an object may determine whether to remove an object touch region based on whether regions in between adjacent object touch regions are all included in an object adjacent region 1710 from among object touch regions 1730, 1732, 1734, 1736, 1738, 1740, and 1742 displayed in an object image. As an example, when the regions in between the adjacent object touch regions 1736, 1740, and 1742 are all included in the object adjacent region 1710 as shown in FIG. 17, the apparatus for sensing the object may maintain the object touch region 1736 most remote from a center point 1720 of the object adjacent region, and remove the remaining object touch regions 1740 and 1742.

Figure 18:
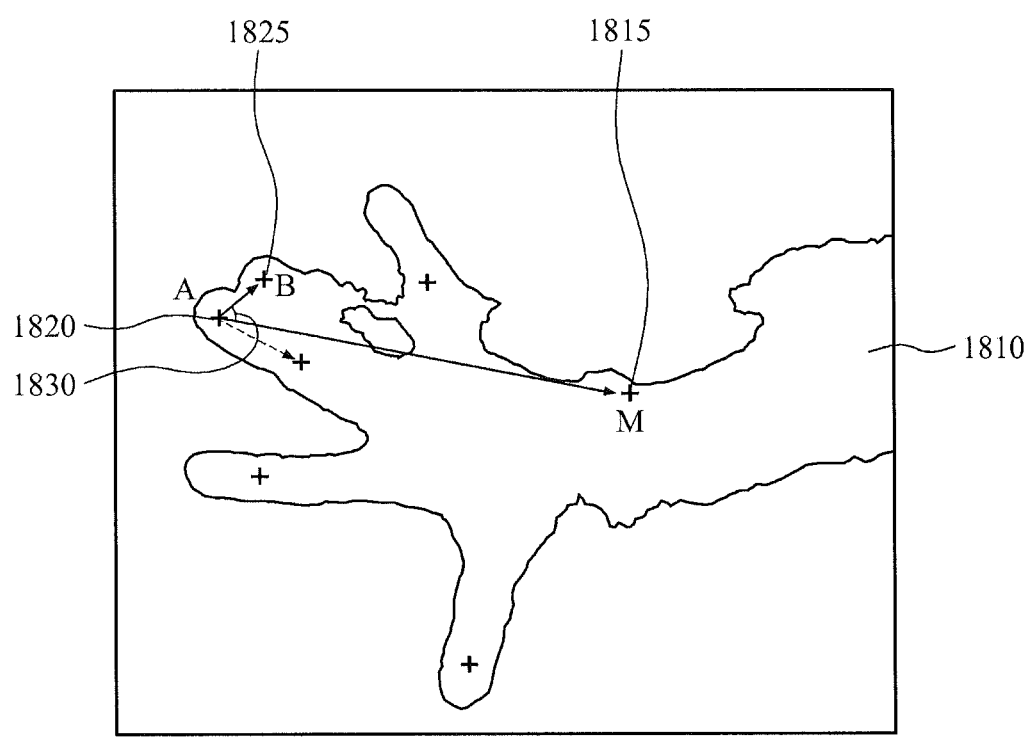
FIG. 18 illustrates a process of determining whether to remove an object touch region according to still another example embodiment.

FIG. 18 illustrates a process of determining whether to remove an object touch region according to still another example embodiment.

A case may exist during a process of removing an object touch region unintended by a user from the adjacent object touch regions of FIG. 17. As an example, when object images with respect to two fingers of the user are generated to overlap, an object touch region may exist in both fingers while an object touch region most remote from a center point of an object adjacent region is maintained and other object touch regions may be removed.

When an object touch region "A" 1820 and an object touch region "B" 1830 are all included in the object adjacent region 1810, the apparatus for sensing the object may determine whether to remove an object touch region "B" 1825 based on an angle 1830 obtained between an edge obtained by a center point 1815 of an object adjacent region and an edge obtained by the object touch region "A" 1820 and the object touch region "B" 1825. As an example, when the angle 1830 is greater than a predetermined and/or desired angle, the apparatus for sensing the object may maintain the object touch region "B" 1825, and when the angle 1830 is less than the predetermined and/or desired angle, remove the object touch region "B" 1825.

Figure 19:
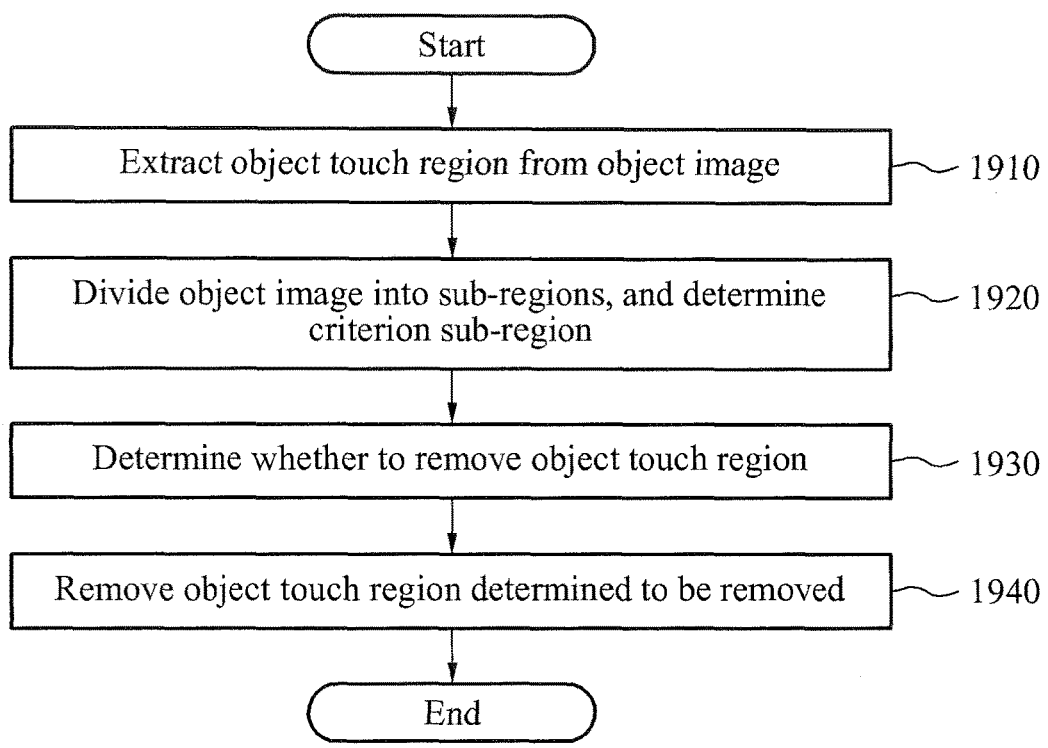
FIG. 19 illustrates a method of sensing an object according to an example embodiment.

FIG. 19 illustrates a method of sensing an object according to an example embodiment.

In operation 1910, an apparatus for sensing an object may extract an object touch region from an object image obtained by capturing an object. The apparatus for sensing the object may estimate a background region absent a motion during a predetermined and/or desired period of time from the object image obtained by capturing the object, and generate a difference image based on the background image. The apparatus for sensing the object may extract the object touch region through a filtering process, such as at least one of Gaussian filtering, median filtering, and high-pass filtering, and an amplification process.

In operation 1920, the apparatus for sensing the object may divide the object image into a plurality of sub-regions, and determine a criterion sub-region from among the plurality of divided sub-regions. The apparatus for sensing the object may determine a sub-region including a greatest object touch region to be the criterion sub-region from among the plurality of divided sub-regions. The apparatus for sensing the object may determine a directivity of the object touch region based on a position of the criterion sub-region. When the criterion sub-region is not determined by such a method, the apparatus for sensing the object may determine a directivity of object touch regions by rotating the plurality of divided sub-regions by a predetermined and/or desired angle centered at a center point of an object adjacent region displayed in the object image. The apparatus for sensing the object may determine the criterion sub-region, and determine the directivity of the object touch region based on a number of object touch regions included in the plurality of rotated sub-regions.

In operation 1930, the apparatus for sensing the object may determine whether to remove the object touch region displayed in the object image based on the object touch region included in the criterion sub-region. The apparatus for sensing the object may determine an object touch region to be removed based on the directivity of the object touch region. The apparatus for sensing the object may determine whether to remove the object touch region displayed in the object image based on a distance between a center point of the object adjacent region displayed in the object image and the center point of the object touch region included in the criterion sub-region. The apparatus for sensing the object may determine to remove object touch regions remaining subsequent to excluding an object touch region most remote from the center point of the object adjacent region from among adjacent object touch regions when the regions in between the adjacent object touch regions are all included in the object adjacent region. The apparatus for sensing the object may determine the object touch region to be removed based on an angle obtained between the center point of the object adjacent region and the position of the adjacent object touch regions.

In operation 1940, the apparatus for sensing the object may remove, from the object image, the object touch region ultimately determined to be removed. The apparatus for sensing the object may remove object touch regions unintended by a user from among object touch regions included in the object image.

Figure 20:
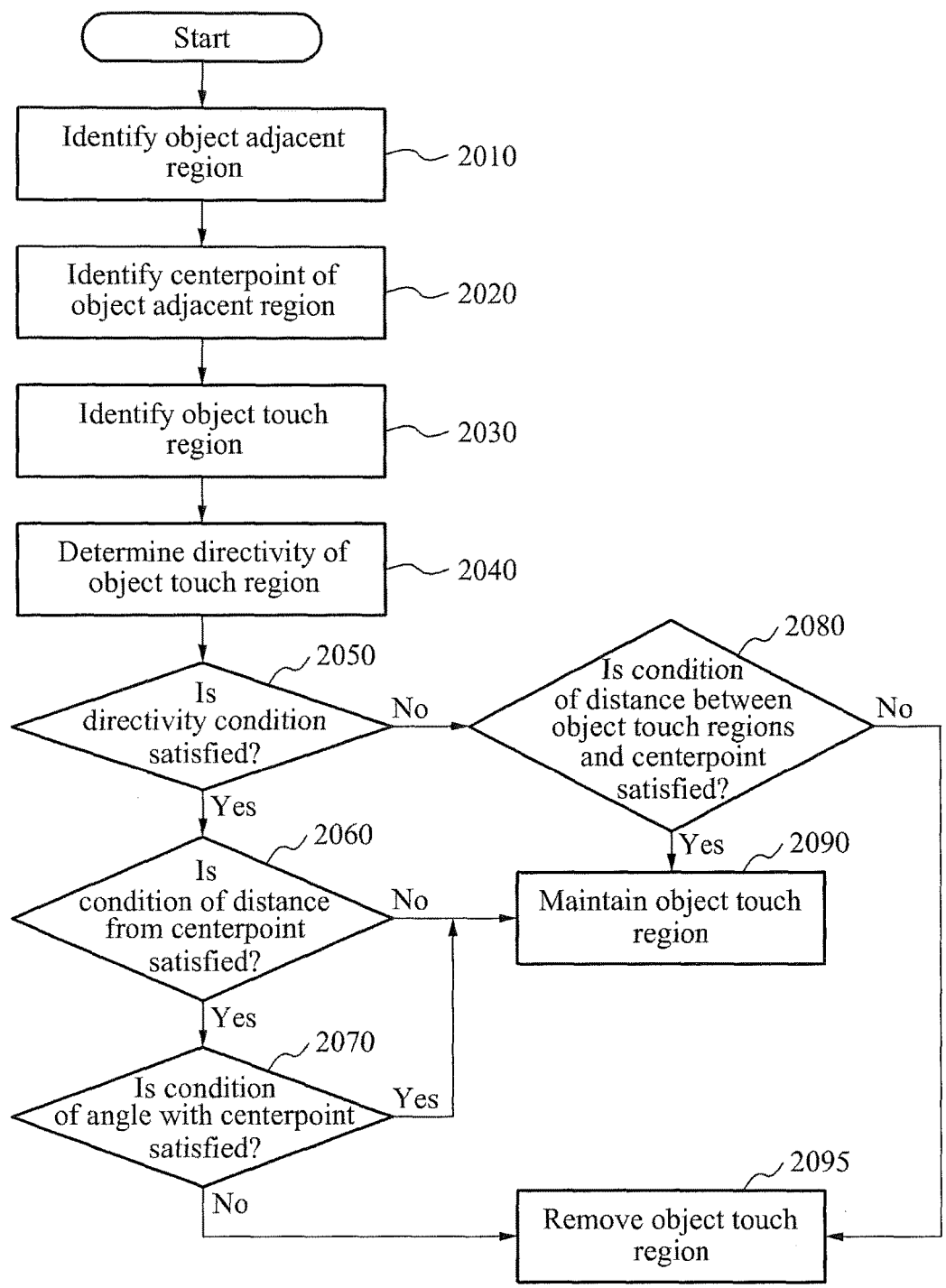
FIG. 20 illustrates a method of sensing an object according to another example embodiment.

FIG. 20 illustrates a method of sensing an object according to other example embodiments.

In operation 2010, an apparatus for sensing an object may identify an object adjacent region. The apparatus for sensing the object may determine a range of the object adjacent region by adjusting a threshold value to be applied to an object image. As an example, the apparatus for sensing the object may perform filtering on the object image, and extract the object adjacent region from the object image. The apparatus for sensing the object may extract the object adjacent region through use of an adaptive threshold value determined based on Equation 2.

In operation 2020, the apparatus for sensing the object may identify a center of the object adjacent region. In operation 2030, the apparatus for sensing the object may identify an object touch region in which an object is touched on a display.

In operation 2040, the apparatus for sensing the object may determine a directivity of the object touch region. The apparatus for sensing the object may divide the object image into a plurality of sub-regions, and determine a criterion sub-region based on a number of object touch regions included in the plurality of divided sub-regions. The apparatus for sensing the object may determine the directivity of the object touch region based on the criterion sub-region and the center point of the object adjacent region.

In operation 2050, the apparatus for sensing the object may determine whether to remove the object touch region based on "directivity condition". The apparatus for sensing the object may determine to remove a target object touch region when the target object touch region has a directivity reverse to the directivity of the object touch region. As an example, the apparatus for sensing the object may determine a discriminant to apply to the object image based on the directivity of the object touch region, and determine to remove an object touch region satisfying the discriminant.

In operation 2060, the apparatus for sensing the object may determine whether to remove the object touch region based on "condition of distance from center point". The apparatus for sensing the object may determine to maintain an object region most remote from the center point of the object adjacent region, and determine to remove remaining object regions when regions in between adjacent object touch regions are all included in the object adjacent region.

In operation 2070, the apparatus for sensing the object may determine whether to remove the object touch region based on "condition of angle with center point". The apparatus for sensing the object may determine even the object touch region determined to be removed in operation 2060 to maintain the object touch region determined to be removed in operation 2060 when an angle obtained amongst a center point of the object touch region determined to maintain in operation 2060, a center point of the object touch region determined to be removed in operation 2060, and a center point of the object adjacent region is greater than a predetermined and/or desired angle.

In operation 2080, the apparatus for sensing the object may determine whether to remove the object touch region based on "condition of distance between object touch regions in criterion sub-region and center point of object adjacent region". The apparatus for sensing the object may determine whether to remove the object touch region determined to be removed in operation 2050 with respect to even the object touch region determined to be removed in operation 2050, based on the distance between the center point of the object touch regions included in the criterion sub-region and the center point of the object adjacent region. As an example, the apparatus for sensing the object may determine whether to remove the object touch region by comparing an average distance value "ave_dist" obtained by averaging distances between the center point of the object touch regions included in the criterion sub-region and the center point of the object adjacent region to a distance "a_dist" between the center point of the object touch region determined to be removed in operation 2050 and the center point of the object adjacent region. When the distance "a_dist" of the touch object region determined to be removed in operation 2050 is greater than a result obtained by dividing the average distance value "ave_dist" of the touch object regions by a predetermined and/or desired constant, the apparatus for sensing the object may determine to maintain the touch object region determined to be removed in operation 2050.

In operation 2090, the apparatus for sensing the object may maintain the object touch regions determined to maintain in the object image. In operation 2095, the apparatus for sensing the object may remove, from the object image, the object touch region determined to be removed. Over operations 2010 through 2095, object touch regions unintended by the user may be removed from the object image.

The apparatus for sensing the object may perform at least one of operations 2050 through 2080, and may not be limited to example embodiments in which all of operations 2050 through 2080 are performed.

A portable device as used throughout the present specification includes mobile communication devices, such as a personal digital cellular (PDC) phone, a personal communication service (PCS) phone, a personal handyphone system (PHS) phone, a Code Division Multiple Access (CDMA)-2000 (1×, 3×) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (e.g. car navigation system), and the like. Also, the portable device as used throughout the present specification includes a digital camera, a plasma display panel, and the like.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. An apparatus for sensing an object, the apparatus comprising:
   a display;
   a light source configured to emit light toward the display;
   a pattern layer on the display, the pattern layer including a first pattern for identifying a position on the display;
   a camera configured to generate a pattern image based on light reflected off of the pattern layer; and
   a controller configured to determine whether an operation of at least one of the light source and the camera is appropriate based on whether a criterion pattern is identifiable from the pattern image and adjust the operation of the at least one of the light source and the camera based on a second pattern in the pattern image according to the result of the determination.

2. The apparatus of claim 1, wherein the controller is configured to adjust at least one of a brightness of the light source and an exposure time of the camera based on the pattern image.

3. The apparatus of claim 1, wherein the controller is configured to adjust the operation of the at least one of the light source and the camera based on at least one of a distribution of the second pattern in the pattern image, a brightness of the second pattern, a resolution of the second pattern, and a shape of the second pattern.

4. The apparatus of claim 1, wherein the controller is configured to identify the criterion pattern and neighboring patterns in the pattern image based on a brightness of the light source and an exposure time of the camera, the criterion pattern being larger than the neighboring patterns, and the controller configured to increase at least one of the brightness of the light source and the exposure time of the camera if the controller does not identify the criterion pattern.

5. The apparatus of claim 1, wherein the controller is configured to identify a number of second patterns in the pattern image, and the controller is configured to increase at least one of a brightness of the light source and an exposure time of the camera if the number of second patterns is less than a desired number.

6. The apparatus of claim 1, wherein the controller is configured to identify the criterion pattern in the pattern image based on a brightness of the light source and an exposure time of the camera, and the controller is configured to adjust the operation of the at least one of the light source and the camera based on a size of the criterion pattern.

7. The apparatus of claim 1, wherein the controller is configured to identify a number of second patterns in the pattern image, and the controller is configured to adjust the operation of the at least one of the light source and the camera based on the number of second patterns.

8. The apparatus of claim 1, wherein the controller is configured to extract center points from a plurality of pattern regions in the pattern image and adjust the operation of the at least one of the light source and the camera based on whether at least one of a number of the extracted center points and positions of the extracted center points.

9. The apparatus of claim 8, wherein the controller is configured to convert the pattern image to a binarized pattern image and extract the center points of the pattern image based on the binarized pattern image.

10. The apparatus of claim 1, wherein the controller is configured to estimate a distance between a plurality of first patterns in the pattern layer based on view angle information of the camera and distance information from the camera to the display.

11. The apparatus of claim 10, wherein the controller is configured to identify a position on the display corresponding to a position within the pattern image based on a distance ratio between the first patterns in the pattern layer.

12. The apparatus of claim 1, wherein the first pattern includes another criterion pattern and neighboring patterns, and the criterion pattern is larger than the neighboring patterns.

13. The apparatus of claim 1, wherein
   the light source is configured to emit an infrared ray (IR) towards the display, and
   the camera is configured to generate an image of an object in response to an IR reflected off of the object and input to the camera.

14. A method of identifying a calibration pattern of an apparatus for sensing an object, the method comprising:
   capturing a pattern image on a display;
   determining whether an operation of at least one of a light source and a camera is appropriate based on whether a criterion pattern is identifiable from the pattern image; and
   adjusting at least one of a brightness of the light source emitting light and an exposure time of the camera based on patterns in the pattern image according to the result of the determination.

15. The method of claim 14, wherein the adjusting the at least one of the brightness of the light source and the exposure time of the camera comprises:
   identifying the criterion pattern and neighboring patterns in the pattern image, the criterion pattern being larger than the neighboring patterns; and
   increasing at least one of the brightness of the light source and the exposure time of the camera based on the identifying.

16. The method of claim 14, wherein the adjusting the at least one of the brightness of the light source and the exposure time of the camera comprises:
   adjusting the at least one of the brightness of the light source and the exposure time of the camera based on at least one of a distribution of the patterns, a number of the patterns, a brightness of the patterns, a resolution of the patterns, and a shape of the patterns.

17. The method of claim 16, wherein the adjusting the at least one of the brightness of the light source and the exposure time of the camera comprises:
- determining whether at least one of the distribution of the patterns, the number of the patterns, and the brightness of the patterns satisfies conditions;
- adjusting the at least one of the brightness of the light source and the exposure time of the camera based on a result of the determining;
- re-capturing the pattern image on the display based on the adjusted at least one of the brightness of the light source and the exposure time of the camera; and
- determining whether patterns of the re-captured pattern image satisfy the conditions.

18. The method of claim 15, wherein the identifying the criterion pattern and the neighboring patterns comprises:
- converting the pattern image to a binarized pattern image; and
- identifying the criterion pattern based on a pattern region in the binarized pattern image.

19. The method of claim 15, wherein the identifying the criterion pattern and the neighboring patterns comprises:
- identifying a first largest pattern among the patterns;
- identifying a second largest pattern among the patterns; and
- determining whether the first largest pattern is the criterion pattern based on a size ratio of the first largest pattern to the second largest pattern.

20. The method of claim 14, wherein the adjusting the at least one of the brightness of the light source and the exposure time of the camera comprises:
- identifying the criterion pattern and neighboring patterns in the pattern image, the criterion pattern being larger than the neighboring patterns; and
- adjusting the at least one of the brightness of the light source and the exposure time of the camera based on the identifying and a number of the neighboring patterns.

21. The method of claim 14, wherein the adjusting the at least one of the brightness of the light source and the exposure time of the camera comprises:
- identifying the criterion pattern;
- identifying a number of the patterns disposed in a vertical direction and a horizontal direction centered at the criterion pattern; and
- increasing a least one of the brightness of the light source and the exposure time of the camera based on the identifying.

22. The method of claim 14, wherein the pattern image is an image generated in response to the light emitted from the light source being reflected off of a pattern layer on the display and input to the camera.

23. A method of sensing an object, the method comprising:
- extracting a first object touch region from an object image;
- dividing the object image into a plurality of sub-regions;
- first determining a criterion sub-region from among the plurality of sub-regions;
- second determining whether to remove the first object touch region in the object image based on a second object touch region in the criterion sub-region; and
- removing, from the object image, the first object touch region based on the second determining,
- wherein the determining whether to remove the object touch region comprises:
  - determining a condition to be applied to the object image based on a directivity of the second object touch region in the criterion sub-region.

24. The method of claim 23, wherein the determining the condition to be applied to the object image comprises:
- determining the directivity of the second object touch region based on a center point of an object neighboring region in the object image.

25. The method of claim 24, wherein the determining whether to remove the first object touch region comprises:
- determining whether to remove the first object touch region based on a distance between the center point of the object neighboring region and the second object touch region.

26. The method of claim 24, wherein the determining whether to remove the first object touch region comprises:
- determining other object touch regions;
- excluding one object touch region of the other object touch regions, the excluded object touch region being farthest from the center point of the object neighboring region among the other object touch regions; and
- determining to remove at least one of the other object touch regions remaining subsequent to the excluding.

27. The method of claim 26, wherein the determining whether to remove the first object touch region comprises:
- determining whether to remove the first object touch region based on an angle between the center point of the object neighboring region and a position of a plurality of neighboring object touch regions if all the neighboring object touch regions are in the object neighboring region.

28. The method of claim 23, wherein the determining the criterion sub-region comprises:
- determining a sub-region including a largest object touch region to be the criterion sub-region.

29. The method of claim 23, wherein the determining the criterion sub-region comprises:
- rotating at least one of the sub-regions and the first object touch region to a degree based on a center point of an object neighboring region in the object image; and
- determining the criterion sub-region based on a result of the rotating.

30. The method of claim 23, wherein the extracting the first object touch region from the object image comprises:
- estimating a background region of the object image during a period of time;
- removing the background region from the object image; and
- extracting the first object touch region from a region of the object image remaining subsequent to removing the background region.

31. An apparatus for sensing an object, the apparatus comprising:
- an object touch region extractor configured to extract a first object touch region from an object image;
- a criterion sub-region determiner configured to divide the object image into a plurality of sub-regions, and determine a criterion sub-region from among the plurality of sub-regions; and
- an object touch region determiner configured to determine whether to remove the first object touch region based on a second object touch region in the criterion sub-region,
- wherein the object touch region determiner is configured to determine a condition to be applied to the object image based on a directivity of the second object touch region in the criterion sub-region.

32. The apparatus of claim 31, wherein the object touch region extractor is configured to adaptively determine a threshold value for extracting the first object touch region based on a property of a camera generating the object image.

33. The apparatus of claim 32, wherein the object touch region extractor is configured to determine a threshold value for extracting the first object touch region based on a first intensity property and a second intensity property of a pixel in a camera that generates the object image, the first intensity being higher than the second intensity.

* * * * *